(12) United States Patent
Matsushima

(10) Patent No.: US 8,215,667 B2
(45) Date of Patent: Jul. 10, 2012

(54) KNEE AIRBAG DEVICE FOR A VEHICLE

(75) Inventor: Hitoshi Matsushima, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 83 days.

(21) Appl. No.: 12/678,912

(22) PCT Filed: Oct. 29, 2008

(86) PCT No.: PCT/JP2008/069670
§ 371 (c)(1),
(2), (4) Date: Jul. 2, 2010

(87) PCT Pub. No.: WO2010/050019
PCT Pub. Date: May 6, 2010

(65) Prior Publication Data
US 2011/0260432 A1   Oct. 27, 2011

(51) Int. Cl.
*B60R 21/20* (2006.01)
(52) U.S. Cl. .................. 280/730.1; 280/728.3
(58) Field of Classification Search .............. 280/728.3, 280/730.1, 732, 752
See application file for complete search history.

(56) References Cited

U.S. PATENT DOCUMENTS

| 6,685,217 B2 * | 2/2004 | Abe ................. 280/730.1 |
| 6,705,638 B2 | 3/2004 | Abe et al. |
| 2003/0132618 A1 | 7/2003 | Suzuki et al. |
| 2005/0046158 A1 * | 3/2005 | Abe ................. 280/730.1 |

FOREIGN PATENT DOCUMENTS

| JP | A-11-59305 | 3/1999 |
| JP | A 11-321539 | 11/1999 |
| JP | A-2001-30862 | 2/2001 |
| JP | A-2002-356137 | 12/2002 |
| JP | A-2004-9985 | 1/2004 |
| JP | A-2005-145111 | 6/2005 |
| JP | A 2006-036142 | 2/2006 |
| JP | A-2007-62446 | 3/2007 |
| JP | A-2007-131082 | 5/2007 |
| JP | A-2007-161090 | 6/2007 |
| JP | A-2008-137581 | 6/2008 |

OTHER PUBLICATIONS

International Search Report mailed on Jan. 20, 2009 in corresponding International Application No. PCT/JP2008/069670 (with translation).

* cited by examiner

Primary Examiner — Ruth Ilan
Assistant Examiner — Robert A Coker
(74) Attorney, Agent, or Firm — Oliff & Berridge, PLC

(57) ABSTRACT

A knee airbag device for a vehicle is provided that is capable of effectively protecting both knees of a seat occupant, regardless of position, shape or the like of an airbag door relative to the seat. In a passenger seat knee airbag device, a tear line of an airbag door retainer is broken and airbag doors are deployed upward and downward by deployment force of a knee airbag that receives a gas supply from an inflator. Thus, the knee airbag is deployed toward the knees of the occupant through an aperture portion formed in the airbag door retainer. A tear line of a form that is non-symmetrical between left and right is formed in a retaining sheet that is for retaining the knee airbag in a folded state. Thus, timings of deployment of the airbag doors by inflation pressure of the knee airbag are caused to differ between a left side portion and a right side portion.

10 Claims, 16 Drawing Sheets

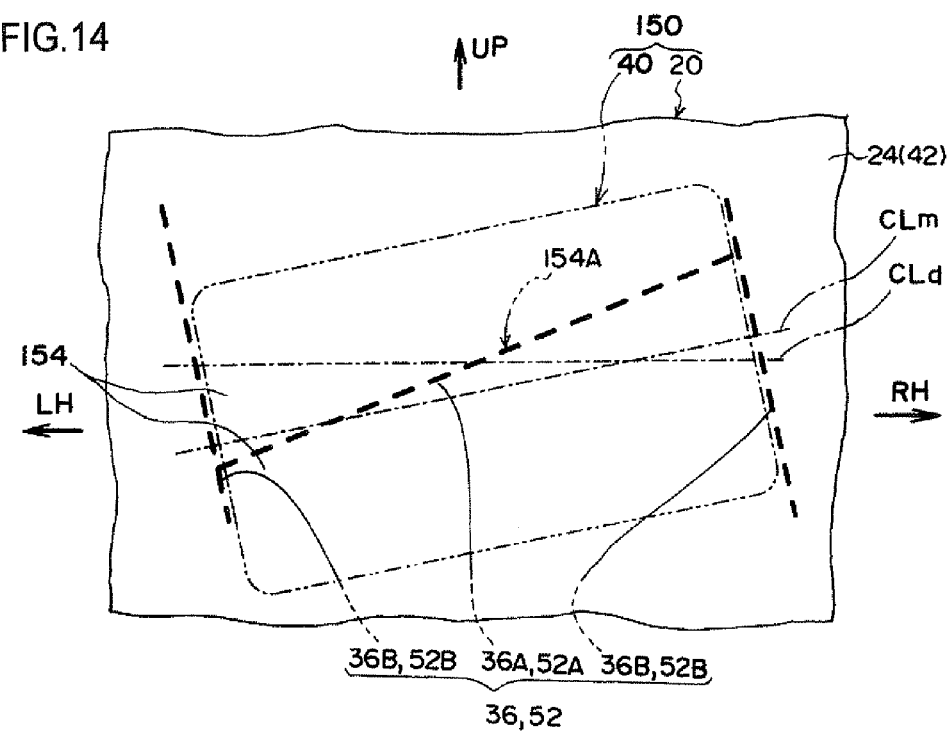
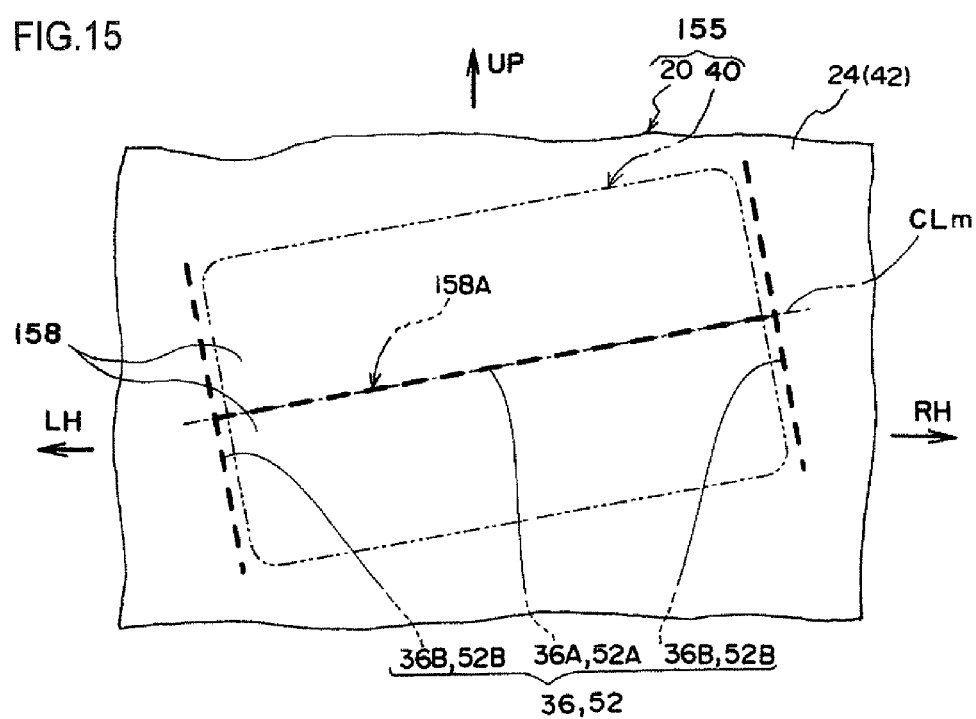

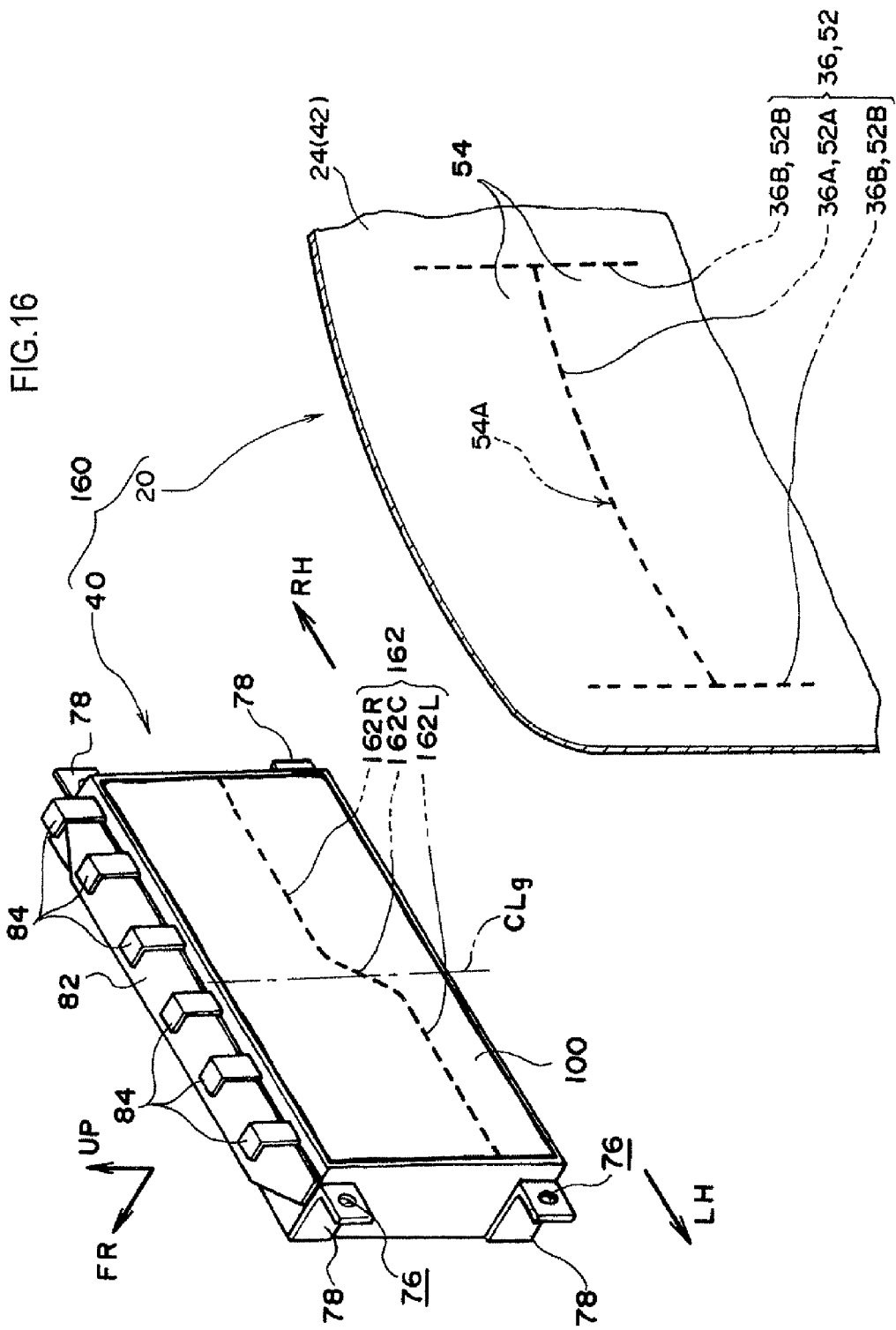

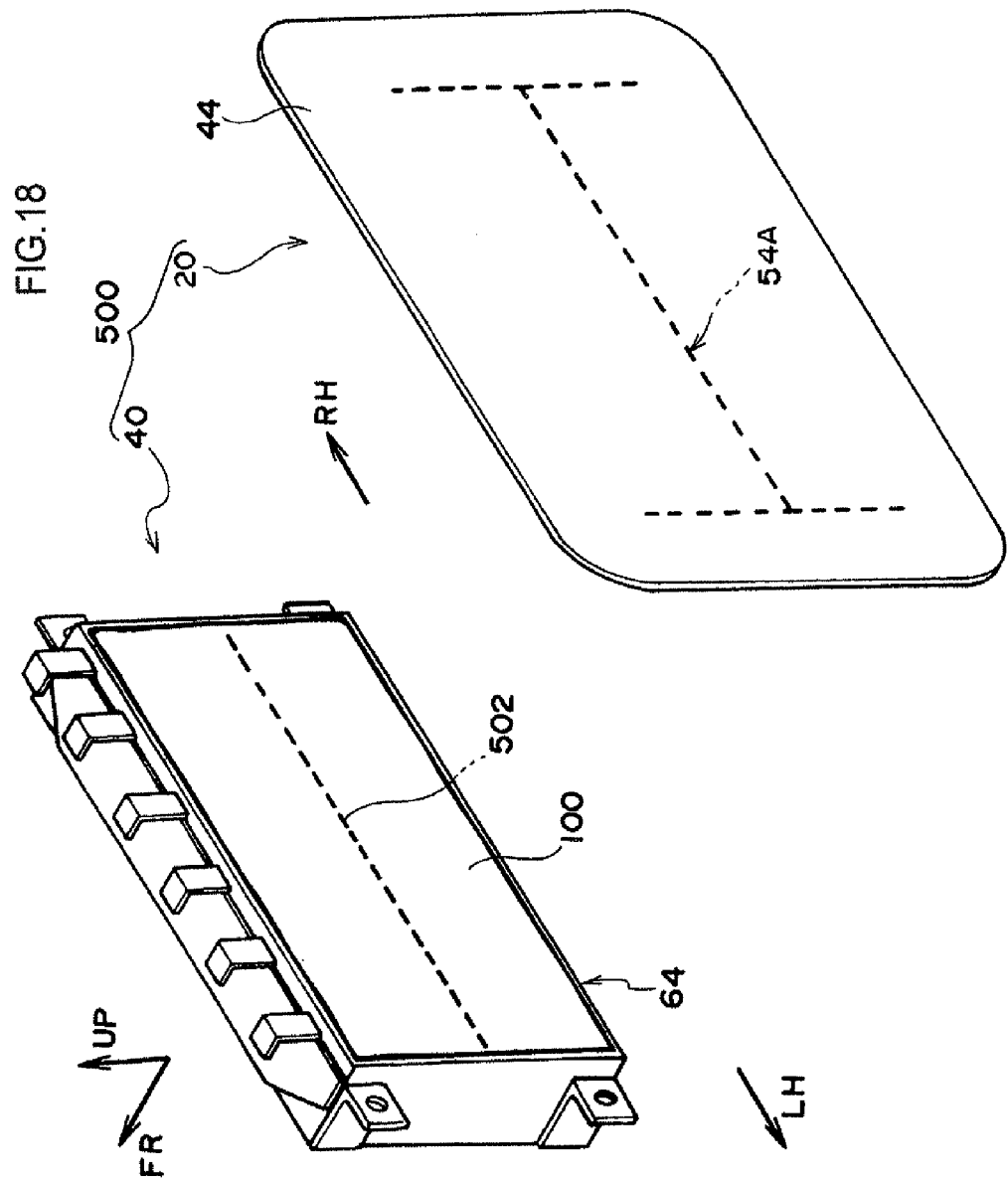

KNEE AIRBAG DEVICE FOR A VEHICLE

TECHNICAL FIELD

The present invention relates to a knee airbag device for a vehicle.

BACKGROUND ART

As knee airbag devices for protecting the knees of occupants, glove door-mounted knee airbag devices are known, which are mounted at glove doors that open/close glove boxes (for example, see Japanese Patent Application Laid-Open (JP-A) Nos. 2002-356137 and 2007-161090).

DISCLOSURE OF INVENTION

Problem to be Solved by the Invention

However, in the related art technologies mentioned above, if a glove door-mounted airbag device is disposed to be offset in a vehicle lateral direction relative to knee positions of a seat occupant or a rear face of the glove door is curved in plan view, there is room for improvement in regard to making capabilities of restraint of the left and right knees equal.

An object of the present invention, in consideration of the above-described circumstances, is to provide a knee airbag device for a vehicle that is capable of effectively protecting both knees of a seat occupant regardless of position, shape and the like of an airbag door relative to the seat.

Means for Solving the Problem

A knee airbag device for a vehicle relating to a first aspect of the present invention is provided with: airbag doors that are provided by forming a tear line at an interior panel of the vehicle, the tear line being broken and the airbag doors producing an aperture portion in the interior panel by being deployed upward and downward; a knee airbag that is accommodated in a folded state at an opposite side of the interior panel from a vehicle cabin side thereof, the knee airbag, by receiving a gas supply from a gas generating device, breaking the tear line of the interior panel member and causing the airbag doors to deploy upward and downward with deployment pressure, and being inflated and deployed through the aperture portion toward knees of an occupant; and a deployment timing adjustment structure that causes timings at which the airbag doors are deployed by inflation pressure of the knee airbag to differ between a portion of the airbag doors that is disposed at one side relative to a vehicle lateral direction center of the seat and a portion that is disposed at the other side.

According to this aspect, when the knee airbag receives the gas supply from the gas generating device, for example, at a time of a frontal collision of the vehicle, it starts inflation and deployment. The interior panel receiving the deployment pressure of this knee airbag is broken at the tear line and the airbag doors formed in the interior panel deploy (cleave) upward and downward. Due to this deployment of the airbag doors, the knee airbag is inflated and deployed, through the aperture portion formed in the interior panel, from the interior panel toward the knees of the occupant at the vehicle cabin side. Hence, the knees of the occupant are protected.

Now, according to the present aspect, deployment timings of the airbag doors at the one side and the other side relative to the vehicle lateral direction center of the seat are made to differ by the deployment timing adjustment structure. That is, inflation deployment timings of a portion of the knee airbag that protects the right knee of the occupant and a portion that protects the left knee may be controlled (adjusted). Thus, in the present aspect, if, for example, the knee airbag and airbag doors or the like are formed or disposed non-symmetrically with respect to the vehicle lateral direction center of the seat before deployment, or are disposed in an attitude that is inclined relative to the seat, or the like, the left and right knees may both be excellently protected without reliance on tuning of the knee airbag (non-symmetricality of a deployed shape, a folded shape, specifications of tethers or the like).

Thus, with the present knee airbag device for a vehicle, both knees of a seat occupant may be effectively protected regardless of position relative to the seat, shape and the like of the airbag doors.

The aspect described above may have a structure in which the airbag doors are provided with a position at a vehicle lateral direction center thereof being offset in the vehicle lateral direction relative to a position of the vehicle lateral direction center of the seat, and the deployment timing adjustment structure is structured such that a side of the airbag doors that is opposite from the side that is offset relative to the vehicle lateral direction center of the seat is deployed earlier than the offset side.

According to this aspect, when the gas generating device operates, the airbag doors are deployed at the opposite side from the side of offsetting of the airbag doors relative to the seat, that is, at the side of the knee that is further from the vehicle lateral direction center of the airbag door, before the side of the other knee. Therefore, in a structure in which the airbag doors are offset in the vehicle lateral direction relative to the seat, the knee further from the vehicle lateral direction center of the airbag doors may be protected substantially equally with the knee at the side that is closer.

The aspects described above may have a structure in which, at the airbag doors, the airbag doors are inclined or curved in plan view such that distances in a vehicle longitudinal direction from a front edge of the seat are different between one vehicle lateral direction side and the other side, and the deployment timing adjustment structure is structured such that the side of the airbag doors that is closer to the front edge of the seat is deployed earlier than the side that is further.

According to this aspect, when the gas generating device operates, the airbag doors are deployed at the side of the airbag in the vehicle longitudinal direction that is closer to the seat front edge, that is, to the knees of the occupant, before the side that is further. Therefore, in a structure in which vehicle longitudinal direction distances to the seat front edge differ between the left and right sides of the airbag doors, the knee airbag may be deployed relatively quickly (with priority) at the side at which the distance from the knees of the occupant is smaller. In other words, in the present aspect, the knee that is further from the airbag doors and the knee at the side that is closer may be protected substantially equally.

The aspects described above may have a structure that further includes a retaining sheet that covers the folded knee airbag and in which a tear line that is broken in association with inflation of the knee airbag is formed along the vehicle lateral direction, wherein the deployment timing adjustment structure is structured by setting separation amounts in a vehicle vertical direction between the tear line of the retaining sheet and a lateral direction tear line along the vehicle lateral direction of the interior panel to be smaller at the side that is deployed earlier than the side that is deployed later.

According to this aspect, the airbag doors (the knee airbag) are deployed preceding with the side at which the distance along the vehicle vertical direction between the tear line along the vehicle lateral direction that is formed in the retaining sheet covering the folded knee airbag and the lateral direction tear line of the interior panel is shorter in the vehicle vertical direction, relative to the side at which it is relatively longer. In the present aspect, utilizing the fact that the closer the tear line of the retaining sheet is to the lateral direction tear line of the interior panel, the easier the airbag doors are to deploy, the deployment timing adjustment structure is constituted with a simple structure.

The aspect described above may have a structure in which the deployment timing adjustment structure is structured with positions in the vehicle vertical direction of the tear line of the retaining sheet and the lateral direction tear line of the interior panel being caused to coincide at the side that is deployed earlier and the tear line of the retaining sheet and the lateral direction tear line of the interior panel being offset in the vehicle vertical direction at the side that is deployed later.

According to this aspect, the airbag doors (the knee airbag) are deployed preceding with the side at which the positions in the vehicle vertical direction of the tear line of the retaining sheet and the lateral direction tear line of the interior panel coincide, relative to the side at which these tear lines are offset in the vehicle vertical direction. Thus, the side of preceding deployment of the airbag doors may be deployed in a shorter duration, and a degree of freedom of setting of the difference in deployment duration between the side of preceding deployment and the side of later deployment may be widened.

The aspects described above may have a structure that further includes a retaining sheet that covers the folded knee airbag and in which a tear line that is broken in association with inflation of the knee airbag is formed along the vehicle lateral direction, wherein the deployment timing adjustment structure is structured with, of the tear line of the retaining sheet, the tear line at the side that is deployed earlier being weakened, with respect to the deployment pressure of the knee airbag, relative to the tear line at the side that is deployed later.

According to this aspect, the airbag doors (the knee airbag) are deployed with the side at which the tear line along the vehicle lateral direction that is formed in the retaining sheet covering the folded knee airbag is relatively weakened preceding relative to the other side. In the present aspect, the deployment timing adjustment structure is constituted with a simple structure, by setting a difference in strength with respect to deployment pressure of the airbag at the tear line of the retaining sheet.

The aspects described above may have a structure in which the tear line of the interior panel includes a lateral direction tear line along the vehicle lateral direction and a pair of left and right vertical tear lines extending in a vehicle vertical direction from two ends of the lateral direction tear line along the vehicle lateral direction, and the deployment timing adjustment structure is structured by setting separation amounts in the vehicle vertical direction of the lateral direction tear line from a vehicle vertical direction center of the airbag doors to be smaller at the side that is deployed earlier than the side that is deployed later.

According to this aspect, the region of the interior panel that is sandwiched between the left and right vertical tear lines constitutes the airbag doors. When the airbag doors receive the deployment pressure of the knee airbag, the upper side region relative to the lateral direction tear line deploys upward, and the lower side region relative to the lateral direction tear line deploys downward. During this deployment, the lateral direction tear line is broken with the side that is closer to the vehicle vertical direction center of the airbag doors preceding the side that is further. That is, the airbag doors are deployed with the side at which the lateral direction tear line is closer to the vehicle vertical direction center of the airbag doors preceding relative to the side at which it is further. Thus, in the present aspect, utilizing the fact that the closer the lateral direction tear line is to the vehicle vertical direction center of the airbag doors, the easier the airbag doors are to deploy, the deployment timing adjustment structure is constituted with a simple structure.

The aspects described above may have a structure in which the deployment timing adjustment structure is structured with the lateral direction tear line being caused to coincide with a position of the vehicle vertical direction center of the airbag doors at the side that is deployed earlier, and the lateral direction tear line being offset to an upper side in the vehicle vertical direction from a position of the vehicle vertical direction center of the airbag doors at the side that is deployed later.

According to this aspect, the airbag doors (the knee airbag) is deployed preceding with the side at which the position in the vehicle vertical direction of the lateral direction tear line of the interior panel coincides with the vehicle vertical direction center of the airbag doors, relative to the side at which this lateral direction tear line is offset upward relative to the vehicle vertical direction center of the airbag doors. Thus, the side of preceding deployment of the airbag doors may be deployed in a shorter duration, and a degree of freedom of setting of the difference in deployment duration between the side of preceding deployment and the side of later deployment may be widened. Further, in the present aspect, a portion of the knee airbag at the side of later deployment touches against a knee of the occupant higher in the vehicle vertical direction relative to a portion at the preceding direction side. Therefore, cases of the shins of occupants being pressed with strong forces by the portion at the side of later deployment of the knee airbag may be suppressed.

The aspects described above may have a structure in which the tear line of the interior panel includes a lateral direction tear line along the vehicle lateral direction and a pair of left and right vertical tear lines extending in a vehicle vertical direction from two ends of the lateral direction tear line along the vehicle lateral direction, and the deployment timing adjustment structure is structured by inclining the lateral direction tear line such that the lateral direction tear line is disposed closer to a vehicle vertical direction center of the airbag doors at the side that is deployed earlier than the side that is deployed later.

According to this aspect, the region of the interior panel that is sandwiched between the left and right vertical tear lines constitutes the airbag doors. When the airbag doors receive the deployment pressure of the knee airbag, the upper side region relative to the lateral direction tear line deploys upward, and the lower side region relative to the lateral direction tear line deploys downward. During this deployment, the lateral direction tear line that is inclined relative to the horizontal plane (the vehicle lateral direction) is broken with the side that is closer to the vehicle vertical direction center of the airbag doors preceding the side that is further. That is, the airbag doors are deployed with the side at which the lateral direction tear line is closer to the vehicle vertical direction center of the airbag doors preceding relative to the side at which it is further. Thus, in the present aspect, utilizing the fact that the closer the lateral direction tear line of the interior panel is to the vehicle vertical direction center of the airbag doors, the easier the airbag doors are to deploy, the deployment timing adjustment structure is constituted with a simple structure.

In the aspects described above, the deployment timing adjustment structure may have a structure in which the tear line of the interior panel includes a lateral direction tear line along the vehicle lateral direction and a pair of left and right vertical tear lines extending in a vehicle vertical direction from two ends of the lateral direction tear line along the vehicle lateral direction, and the deployment timing adjustment structure is structured by disposing the knee airbag to be offset in the vehicle vertical direction relative to the airbag doors such that separation amounts of the lateral direction tear line from a vehicle vertical direction center of the knee airbag are smaller at the side that is deployed earlier than the side that is deployed later.

According to this aspect, the region of the interior panel that is sandwiched between the left and right vertical tear lines constitutes the airbag doors. When the airbag doors receive the deployment pressure of the knee airbag, the upper side region relative to the lateral direction tear line deploys upward, and the lower side region relative to the lateral direction tear line deploys downward. During this deployment, the lateral direction tear line is broken with the side that is closer to the vehicle vertical direction center of the knee airbag preceding the side that is further. That is, the airbag doors are deployed preceding with the side at which the lateral direction tear line is closer to the vehicle vertical direction center of the knee airbag relative to the side at which it is further. Thus, in the present aspect, utilizing the fact that the closer the lateral direction tear line of the interior panel is to the vehicle vertical direction center of the knee airbag, the easier the airbag doors are to deploy, the deployment timing adjustment structure is constituted with a simple structure.

The aspects described above may have a structure in which the interior panel structures a glove door provided at an instrument panel, and the knee airbag is incorporated at the glove door.

According to this aspect, the above-described structure is employed at a glove door, which tends to be restricted in position and shape relative to the seat. Therefore, in a structure in which the knee airbag is incorporated in the glove door, both knees of a seat occupant may be effectively protected regardless of position, shape and the like of the airbag door.

Effect of the Invention

The knee airbag device for a vehicle relating to the present invention as described hereabove has an excellent effect of being able to effectively protect both knees of a seat occupant regardless of shape, position and the like of an airbag door relative to the seat.

BRIEF DESCRIPTION OF THE DRAWINGS

FIG. 14 is a front view illustrating an airbag door retainer structuring a passenger seat knee airbag device relating to a sixth exemplary embodiment of the present invention.

FIG. 15 is a front view illustrating an airbag door retainer structuring a passenger seat knee airbag device relating to a reference example.

FIG. 16 is an exploded perspective view illustrating an airbag module and an airbag door retainer structuring a passenger seat knee airbag device relating to a seventh exemplary embodiment of the present invention.

FIG. 18 is an exploded perspective view illustrating an airbag module and an airbag door retainer structuring a passenger seat knee airbag device relating to a comparative example with an exemplary embodiment of the present invention.

BEST MODE FOR CARRYING OUT THE INVENTION

Figure 1:
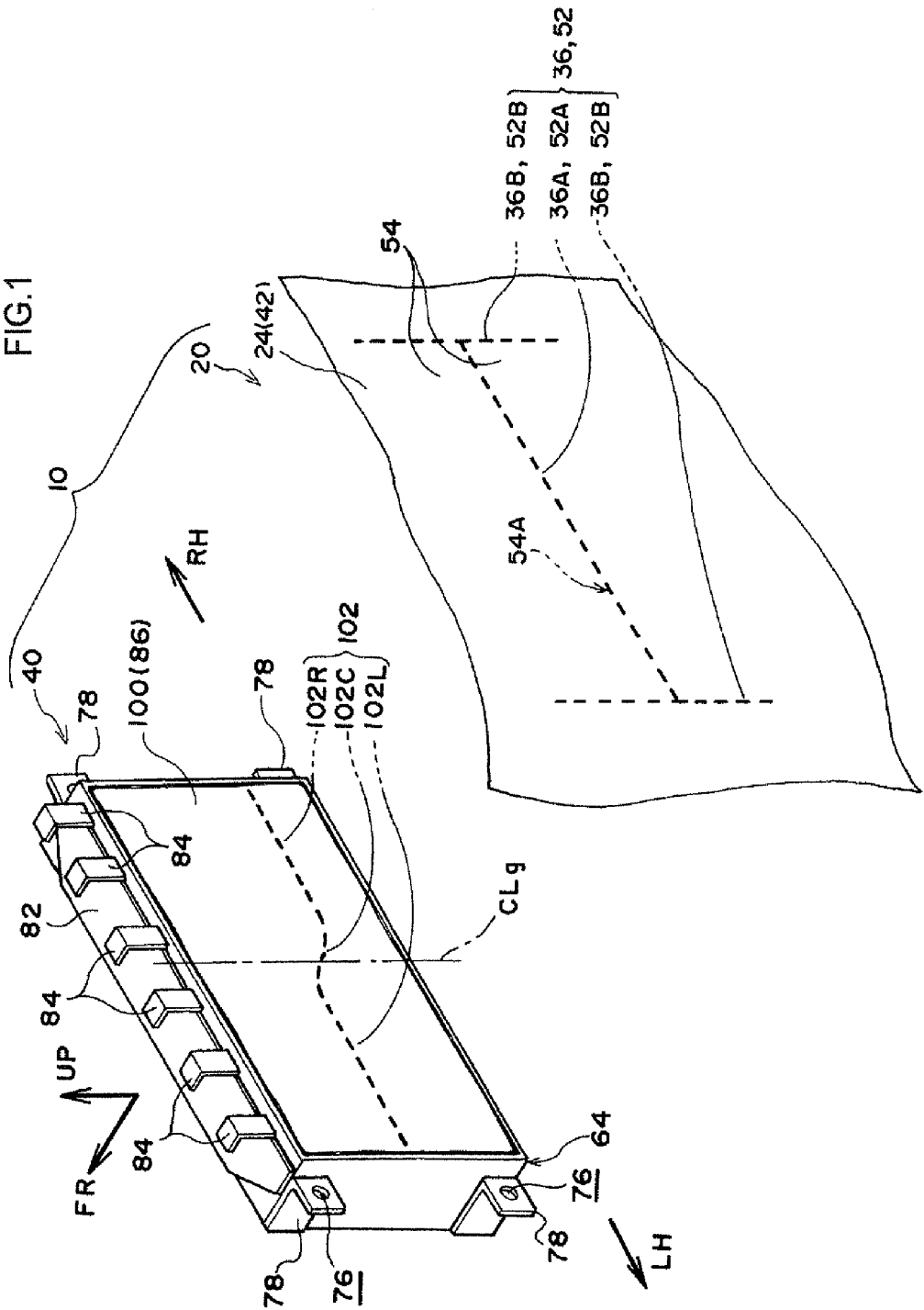
FIG. 1 is an exploded perspective view illustrating an airbag module and an airbag door retainer structuring a passenger seat knee airbag device relating to a first exemplary embodiment of the present invention.

A passenger seat knee airbag device 10 of a type that is incorporated in a glove door, which serves as a knee airbag device for a vehicle relating to an exemplary embodiment of the present invention, is described on the basis of FIG. 1 to FIG. 8. An arrow FR, an arrow UP, an arrow RH and an arrow LH that are marked as appropriate in the drawings indicate, respectively, a forward direction (a direction of progress) of an automobile in which the passenger seat knee airbag device 10 is employed, an upward direction, a right side, which is one direction in a vehicle lateral direction, and a left side, which is the other direction. First, schematic overall structure of the passenger seat knee airbag device 10 will be described, and then structures that are non-symmetrical between left and right, which are principal elements in the present invention, will be described.

Schematic Overall Structure of the Passenger Seat Knee Airbag Device

Figure 5:
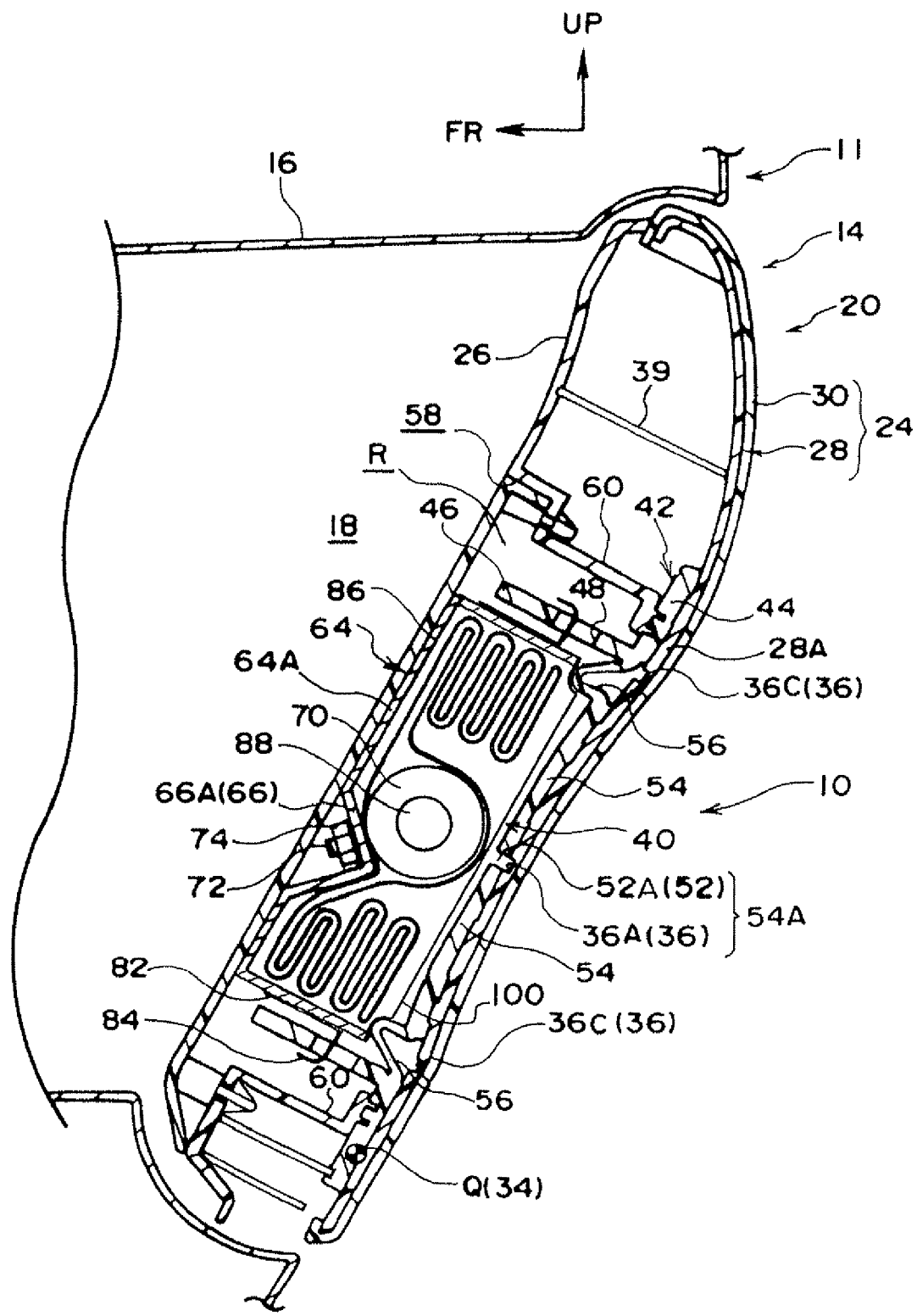
FIG. 5 is a side sectional view illustrating a non-operational state of the passenger seat knee airbag device relating to the first exemplary embodiment of the present invention (an enlarged sectional view cut along line 5-5 of FIG. 7).
Figure 6:
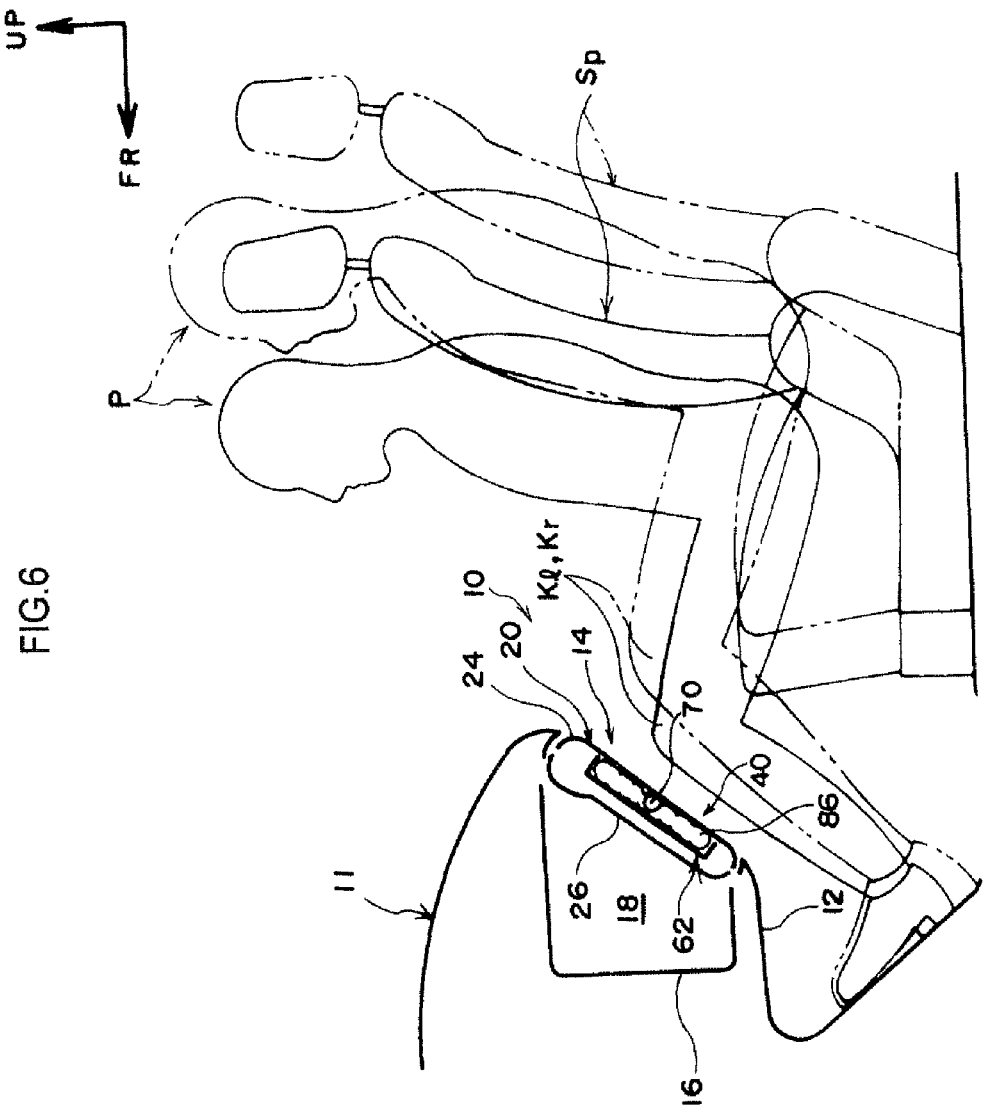
FIG. 6 is a schematic vertical sectional view illustrating a positional relationship between the passenger seat knee airbag device relating to the first exemplary embodiment of the present invention and a seat occupant, viewed from sideward in a vehicle.
Figure 7:
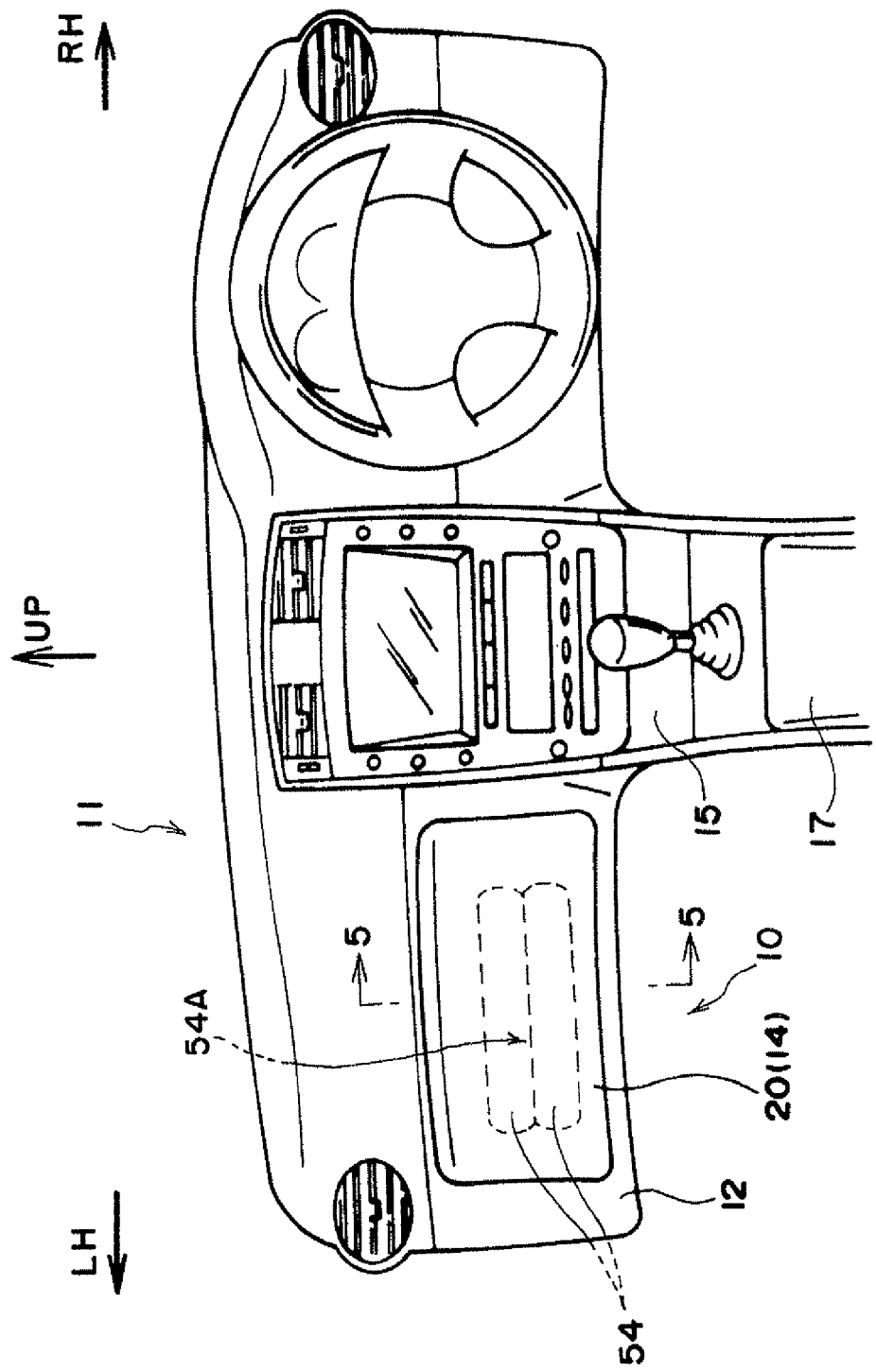
FIG. 7 is a rear view in which the passenger seat knee airbag device relating to the first exemplary embodiment of the present invention and a seat occupant is viewed from a vehicle cabin side.

In FIG. 7, an exterior front view of an instrument panel 11 at which the passenger seat knee airbag device 10 of the glove door-incorporated type is mounted is illustrated. In FIG. 6, a schematic vertical sectional view that illustrates a positional relationship between a glove door 20 and an occupant P sitting on a passenger seat Sp, viewed from sideward in the vehicle, is illustrated. In FIG. 5, an enlarged side sectional view of principal elements of the glove door-incorporated type knee airbag device (an enlarged sectional view cut along line 5-5 of FIG. 7) is illustrated.

As illustrated in FIG. 6 and FIG. 7, a glove box 14 for putting small objects and the like into is disposed at a position of the instrument panel 11 that substantially opposes the knees of an occupant at a passenger seat side (the left side of the drawing in FIG. 7) (more precisely, an upper portion of an instrument panel floor 12 that structures a lower portion of the instrument panel 11). As illustrated in FIG. 7, a center cluster 15 is disposed at the instrument panel 11 at a vehicle lateral direction inward side relative to the glove box 14, and a center console 17 is connected with a lower rear end of the center cluster 15.

As illustrated in FIG. 6, the glove box 14 is structured to include a glove box main body 16, which is made of resin formed in a box shape, and the glove door 20, which is for opening and closing an aperture portion 18 that opens toward the vehicle cabin side of the glove box main body 16 (rearward in the vehicle). As illustrated in FIG. 5 and FIG. 6, the passenger seat knee airbag device 10 is structured with an airbag module 40 incorporated in the glove door 20.

Figure 8:
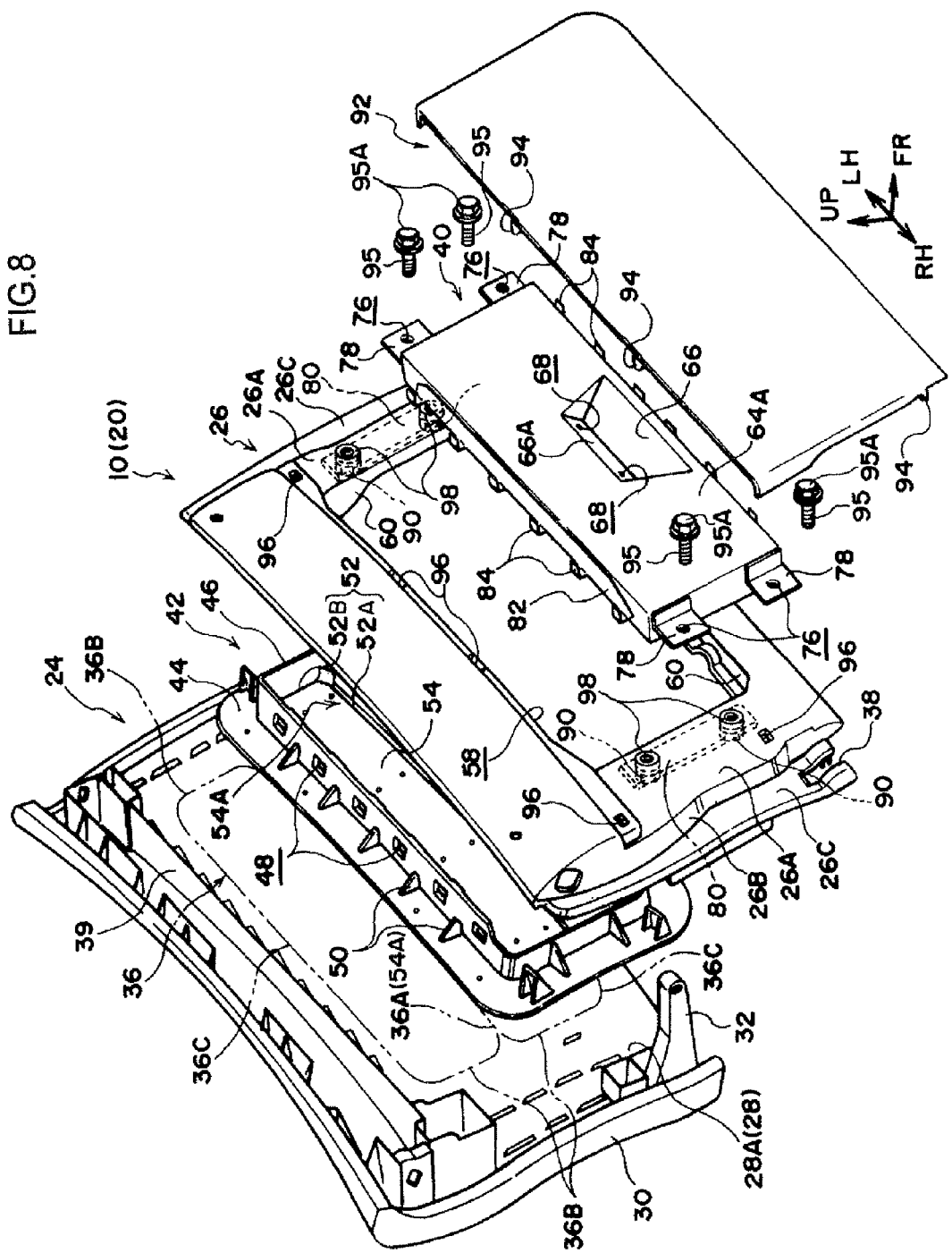
FIG. 8 is an exploded perspective view illustrating a glove door and the airbag module structuring the passenger seat knee airbag device relating to the first exemplary embodiment of the present invention.

As illustrated in FIG. 5 and FIG. 8, the glove door 20 is provided with a rectangular panel-form glove door outer 24, which is disposed at the vehicle cabin interior side and forms a design surface, and a rectangular frame-form glove door inner 26, which is disposed at the vehicle forward side of the glove door outer 24 and is fitted into the glove door outer 24. The glove door outer 24 and the glove door inner 26 are respectively made of resin, and are formed in predetermined shapes by extrusion molding or the like.

The glove door outer 24 is structured as a two-layer structure, of a base member 28 that is formed in a substantially rectangular panel shape and a skin 30 that covers the vehicle cabin interior side surface of the base member 28. The base member 28 and the skin 30 are both made of resin, but the skin 30 is structured of a softer resin material than the base member 28. A pair of left and right stoppers 32 are provided standing from both sides of the lower edge side of the base member 28 of the glove door outer 24. The stoppers 32 protrude from a general portion 28A of the base member 28 to a direction orthogonal to the surface (to the vehicle forward side), and distal end portions thereof interfere with a wall surface of the glove box main body 16 when the glove door 20 is at a fully open position at which a degree of opening of the aperture portion 18 is at a maximum. Thus, the stoppers 32 are structures that serve the purpose of retaining the glove door 20 in the fully open position.

Hinges 34 (see FIG. 5) that are formed in substantial L-shapes in side view are provided at the glove door outer 24, at an inner side of the stoppers 32. One end portions of the hinges 34 are fixed by screws or the like to the glove box main body 16, and the glove door 20 turns around an axis of turning Q shown in FIG. 5 when the glove door 20 is opening and closing.

As illustrated in FIG. 5, tear lines 36 are provided at a vehicle cabin outward facing surface (the surface at the glove door inner 26 side) of the general portion 28A of the glove door outer 24. The tear lines 36 serve as a tear portion that is broken by a bag inflation pressure (deployment pressure) of at least a predetermined value acting via an airbag door retainer 42 which is described below. The tear lines 36 are constituted by a lateral direction central tear line 36A that extends along the vehicle lateral direction at a vehicle vertical direction substantially central portion of the general portion 28A, a pair of left and right vertical tear lines 36B that extend in the vehicle vertical direction from each of the two end portions of the lateral direction central tear line 36A, and lateral direction upper and lower tear lines 36C that join together distal end portions of the vertical tear lines 36B.

Meanwhile, the glove door inner 26 is structured to include a rectangular frame-form floor wall portion 26A that opposes the general portion 28A of the base member 28 of the glove door outer 24, a pair of left and right side wall portions 26B that are formed integrally with two vehicle lateral direction side portions of the floor wall portion 26A, and a pair of left and right protruding portions 26C that protrude towards lateral direction outer sides from end portions of the pair of left and right side wall portions 26B at the glove door outer 24 side thereof. Notches 38 are formed at lower edge sides of the left and right protruding portions 26C at positions opposing the stoppers 32 of the glove door outer 24. The stoppers 32 pass into these notches 38.

The glove door outer 24 and the glove door inner 26 of the structure described above are joined together via vertical direction and horizontal direction ribs 39 that are formed at least one of those two (see FIG. 5). Specifically, the glove door outer 24 and the glove door inner 26 are vibration-welded to distal end portions of the ribs 39. Herein, provided the glove door outer 24 and the glove door inner 26 are structures that may be made integral, for example, fastening with a fastener may be used instead of vibration welding, and vibration welding and fastening may be used in combination. A cavity R for incorporating the airbag module 40, as described below, is formed between the base member 28 of the glove door outer 24 and the floor wall portion 26A of the glove door inner 26. That is, the glove door 20 is structured as a hollow structure.

As illustrated in FIG. 5 and FIG. 8, the airbag door retainer 42, made of plastic, is provided between the glove door outer 24 and glove door inner 26 described above. The airbag door retainer 42 is provided with a rectangular flat plate-form base portion 44 and a rectangular frame-form vertical wall portion 46, which is provided standing from vicinities of outer periphery portions of the base portion 44. Plural anchor holes 48 are formed with predetermined spacings in an upper portion and a lower portion of the vertical wall portion 46. The anchor holes 48 are structured as rectangular apertures. The airbag door retainer 42 is joined, at the base portion 44, to the base member 28 of the glove door outer 24 by welding or the like. A plural number of ribs for reinforcement 50, are provided standing between vicinity portions of the outer periphery portions of the base portion 44 and the vertical wall portion 46. The ribs for reinforcement 50 are disposed so as to span between those two, and are formed in right-angled triangle shapes in side view.

As illustrated in FIG. 8, slits 52 are formed in a central portion (a region encircled by the vertical wall portion 46) of the base portion 44 of the airbag door retainer 42. The slits 52 are formed in a substantial H shape in front view, by substantial middle portions in the vehicle vertical direction of a pair of left and right vertical slits 52B being linked together by a lateral direction slit 52A. The lateral direction slit 52A and the pair of left and right vertical slits 5213 are mutually superposed, along substantially the whole lengths thereof in front view, with the lateral direction central tear line 36A and the vertical tear lines 36B, respectively, of the tear lines 36. Thus, airbag doors 54 are formed in the glove door 20 at the glove door outer 24 side thereof.

Figure 4:
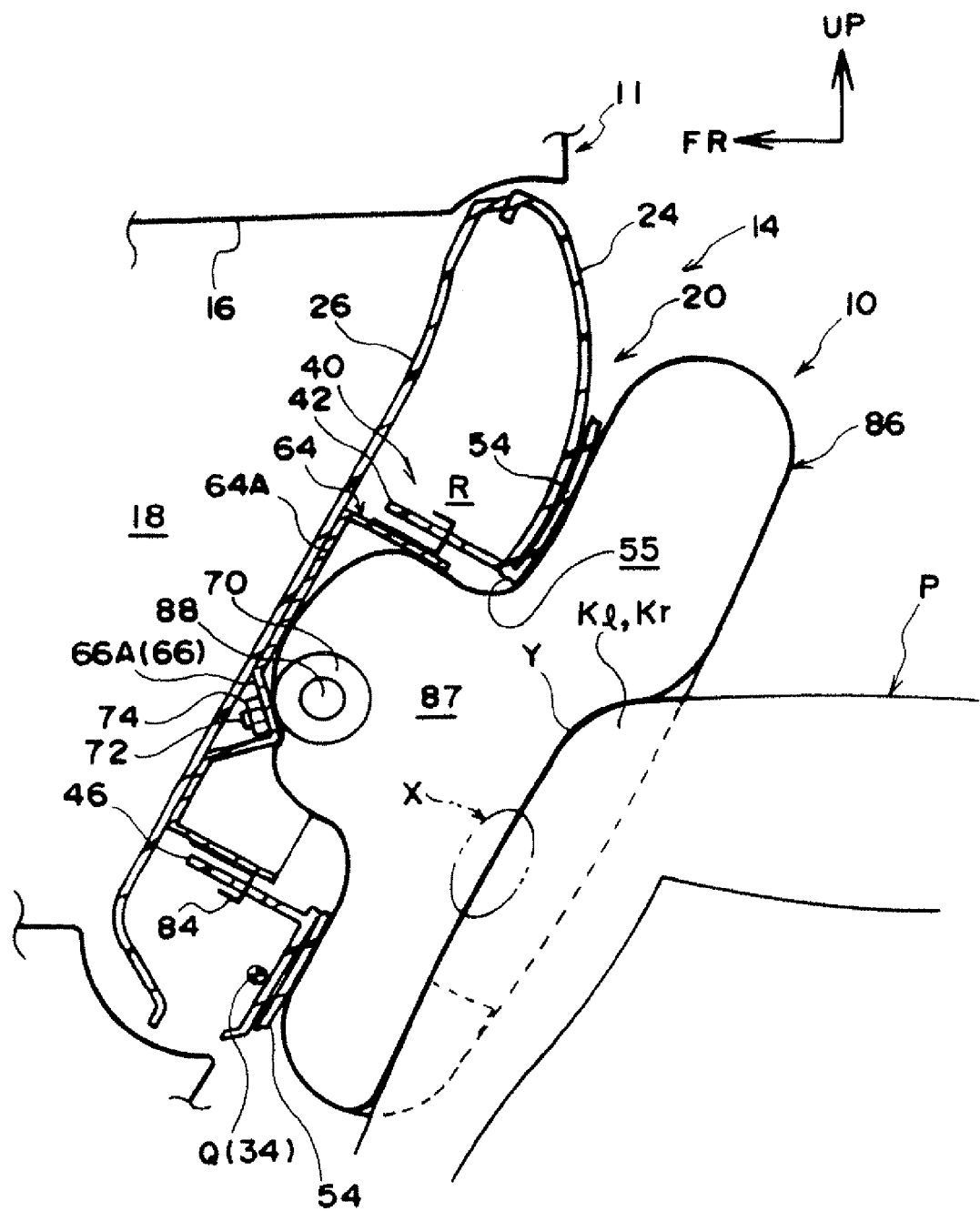
FIG. 4 is a side sectional view illustrating the operational state of the passenger seat knee airbag device relating to the first exemplary embodiment of the present invention.

Specifically, a region of the glove door outer 24 that is encircled by the tear lines 36 (the vertical tear lines 36B and the lateral direction upper and lower tear lines 36C) and a region of the base portion 44 of the airbag door retainer 42 that is sandwiched by the pair of left and right vertical slits 52B serve as the airbag doors 54, which are deployed upward and downward, with the lateral direction central tear line 36A and the lateral direction slit 52A as a dividing line. In the descriptions below, there are cases in which the lateral direction central tear line 36A and the lateral direction slit 52A are collectively referred to as a division line 54A between the upper and lower airbag doors 54. The airbag doors 54 are structured to form an aperture portion 55 in the base portion 44 of the airbag door retainer 42 and the glove door outer 24, as illustrated in FIG. 4, by being deployed upward and downward with the division line 54A as the dividing line. In this embodiment, the division line 54A corresponds to a lateral direction tear line of the present invention. Here, an example in which the slits 52 penetrate through the base portion 44 of the airbag door retainer 42 in the plate thickness direction is illustrated in this embodiment. However, a structure is possible in which grooves (thinned portions) are continuously or intermittently provided in place of the slits 52.

Slacking portions 56 (see FIG. 5) that serve as hinge portions, which are formed in substantial V shapes in side view, are formed at the regions of the airbag door retainer 42 that structure the airbag doors 54, at turning axis sides thereof, which are the opposite sides in the vehicle vertical direction from the sides at which the division line 54A is formed. When the upper and lower airbag doors 54 are deploying upward and downward, the slacking portions 56 are extended (stretched), and the upper and lower airbag doors 54 deploy smoothly. Herein, corner portions of the airbag doors 54 are rounded by corner portions between the vertical tear lines 36B and the lateral direction central tear line 36A of the tear lines 36 and corner portions between the vertical slits 52B and the lateral direction slit 52A of the slits 52 being formed in circular arc shapes.

As illustrated in FIG. 5, a ring-form rib 60 that protrudes toward the airbag door retainer 42 is integrally formed at a peripheral edge portion of a central aperture portion 58 in the floor wall portion 26A of the above-described glove door inner 26. Upper and lower wall portions of the rib 60 are disposed to be substantially parallel with outer sides of the upper and lower wall portions of the vertical wall portion 46 of the airbag door retainer 42 in the assembled state of the glove door 20. In this state, respective distal end portions of the upper and lower wall portions of the rib 60 are welded (vibration-welded) to the base portion 44 of the airbag door retainer 42. Thus, the base portion 44 of the airbag door retainer 42 is fixed in a state that is nipped between the general portion 28A of the base member 28 and the rib 60 of the glove door inner 26.

As illustrated in FIG. 5 and FIG. 8, the airbag module 40 is mounted at the central aperture portion 58 of the glove door inner 26. The airbag module 40 is provided with a module case 64 made of metal. The module case 64 is formed in a box shape with a thin floor. An inflator fixing portion 66, which protrudes toward the vehicle rearward side, is provided at a central lower portion of a floor wall portion 64A of the module case 64 by an isosceles trapezoid shape being knocked in from the vehicle forward side (see FIG. 8). A shape of the inflator fixing portion 66 in a vertical sectional view forms a mountain shape projected to the inside of the module case 64 (see FIG. 5).

A pair of left and right bolt insertion holes 68 are formed in an inclined portion 66A at the vehicle upward side of this inflator fixing portion 66. A pair of stud bolts 72 (see FIG. 5), which protrude toward a radial direction outer side from an axial direction central portion of a later-described inflator 70, are inserted into these bolt insertion holes 68, and nuts 74 are threadingly engaged therewith from a rear face side. Thus, the inflator 70 is fastened and fixed to the inclined portion 66A of the inflator fixing portion 66 of the module case 64.

As illustrated in FIG. 8, at each of two side portions of the module case 64, respective plural numbers of attachment pieces 78 (sets of two for a total of four in the present exemplary embodiment) are respectively fixedly attached. The attachment pieces 78 are made of metal, have fixed portions that are fixed to side walls 64B of the module case 64 and attachment seat portions that are provided extending outward in the lateral direction from the fixed portions, and form substantial "L" shapes in plan view. In the attachment pieces 78, bolt insertion holes 76 are formed at substantially central portions of the attachment seat portions, which face substantially in the vehicle longitudinal direction. The bolt insertion holes 76 penetrate through the attachment seat portions in a plate thickness direction thereof (the vehicle longitudinal direction).

The module case 64, which is to say the airbag module 40, is fixed to the floor wall portion 26A of the glove door inner 26 at two lateral direction side regions relative to the central aperture portion 58 by these plural attachment pieces 78. Specifically, brackets 80, at which welded nuts 90 are provided, are disposed at a rear face side relative to the floor wall portion 26A of the glove door inner 26. Bolts 95 that penetrate through the attachment pieces 78 (the bolt insertion holes 76) and the floor wall portion 26A of the glove door inner 26 are threadingly engaged with the welded nuts 90. Thus, this is a structure (not illustrated) in which the airbag module 40 is fastened and fixed to the glove door inner 26. Herein, collars 98 are nipped in a metal-touching state between head portions 95A of the bolts 95 and the brackets 80, such that excessive fastening loads do not act on the floor wall portion 26A of the glove door inner 26.

Strip-form anchor fixtures 82 are attached to an upper portion and a lower portion of the module case 64. Anchor pieces 84 that are L-shaped in side view are integrally formed at one edges of the anchor fixtures 82 (at the airbag door retainer 42 side thereof). The anchor pieces 84 are plurally separately provided in correspondence with the aforementioned anchor holes 48 formed in the vertical wall portion 46 of the airbag door retainer 42. In this exemplary embodiment, the airbag door retainer 42 is attached to the module case 64 by the anchor pieces 84 being inserted into and anchored at the anchor holes 48.

As illustrated in FIG. 5, the inflator 70 that serves as a gas generating device and a knee airbag 86 that is inflated by gas being emitted from the inflator 70 are assembled inside the module case 64. This inflator 70 is formed in a cylinder shape whose outer diameter is accommodated in the module case 64. A gas emission portion 88 is coaxially formed at an end portion of the axial direction of the inflator 70. The gas emission portion 88 has an outer diameter that is a smaller diameter than the outer diameter of the inflator 70, and plural gas emission holes (not shown) are formed in a peripheral wall portion of the gas emission portion 88.

Figure 2:
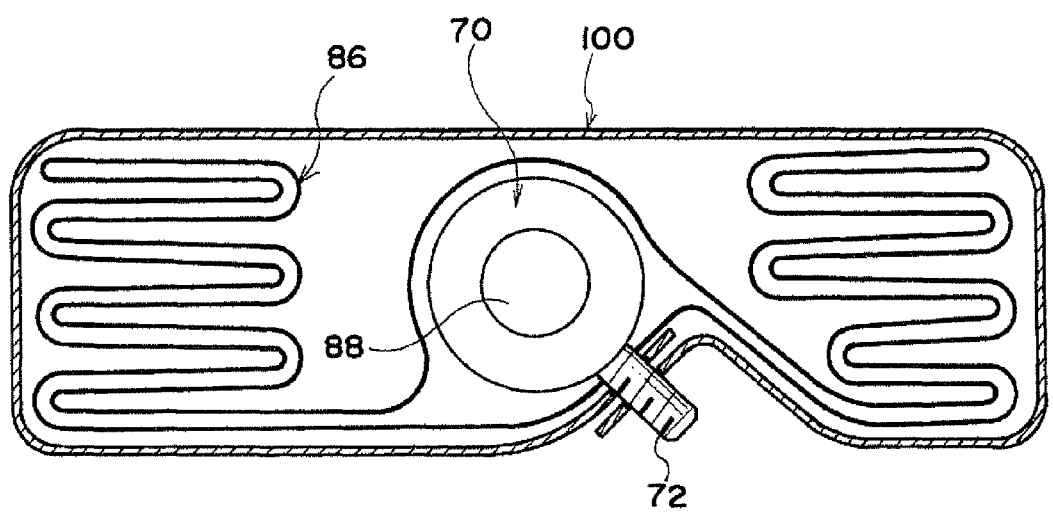
FIG. 2 is a side sectional view of a state in which an airbag structuring the passenger seat knee airbag device relating to the first exemplary embodiment of the present invention is covered with a retaining sheet.

Meanwhile, the knee airbag 86 is accommodated in the module case 64 in a folded state. More specifically, it is folded to a size that can be accommodated in the module case 64 by an upper portion and a lower portion of the knee airbag 86 in a flat deployed state each being bellows-folded and brought toward the central portion, and the inflator 70 is inserted into a central portion (a height direction central portion) of the knee airbag 86. Further, as illustrated in FIG. 1 and FIG. 2, the airbag module 40 is provided with a retaining sheet 100 for keeping the knee airbag 86 in the above-described folded state. As illustrated in FIG. 2, the retaining sheet 100 covers the knee airbag 86 from front and rear and above and below by being wound round the outside of the knee airbag 86 that accommodates the inflator 70 thereinside and has been folded.

More specifically, in a state in which one end of the retaining sheet 100 is anchored at the stud bolts 72 protruding from the inflator 70, the retaining sheet 100 is wound round the outside of the knee airbag 86, and the other end is anchored at the stud bolts 72 so as to be superposed with the one end. In this state, the stud bolts 72 penetrating through the knee airbag 86 are fastened and fixed to the inflator fixing portion 66 of the module case 64 by the procedure described above. Thus, the knee airbag 86 and the retaining sheet 100 are assembled in a state of being nipped between the inflator 70 and the inflator fixing portion 66.

In this exemplary embodiment, the retaining sheet 100 extends across substantially the whole width of the knee airbag 86 in the folded state (the module case 64) and covers the outside of the knee airbag 86 as described above. In the passenger seat knee airbag device 10, inflation and deployment of the knee airbag 86 is enabled by the retaining sheet 100 being broken at a tear line 102, which is described below. Herein, the retaining sheet 100 may be structured of, for example, cloth (a woven fabric) of natural fibers, synthetic fibers or the like, felt (a nonwoven fabric), paper, a resin sheet or the like.

After assembly of the airbag module 40, the central aperture portion 58 of the glove door inner 26 is closed off with a rear face cover 92 made of resin, which is formed in a rectangular flat plate shape. Plural leg portions 94 are integrally formed from four edges of the rear face cover 92 towards the glove door inner 26. Pawls are formed at distal end portions of the leg portions 94. Correspondingly, plural rectangular insertion holes 96 are formed in the floor wall portion 26A of the glove door inner 26 at outer periphery portions of the central aperture portion 58. The rear face cover 92 is attached to the vehicle forward side surface of the glove door inner 26 by the leg portions 94 being inserted into the insertion holes 96 and resiliently engaged. In this exemplary embodiment, the rear face cover 92 is structured to cover the regions of fastening of the airbag module 40 by the aforementioned attachment pieces 78, from the forward side thereof.

The passenger seat knee airbag device 10 described hereabove operates as illustrated in FIG. 4. At this time, a portion seen with the arrow X shown in FIG. 4 is an upper shin portion of an occupant, and the upper shin portion X is a contact portion directly below a knee cap (knee joint) Y.

Left-Right Non-Symmetrical Structures of the Passenger Seat Knee Airbag Device

Figure 3:
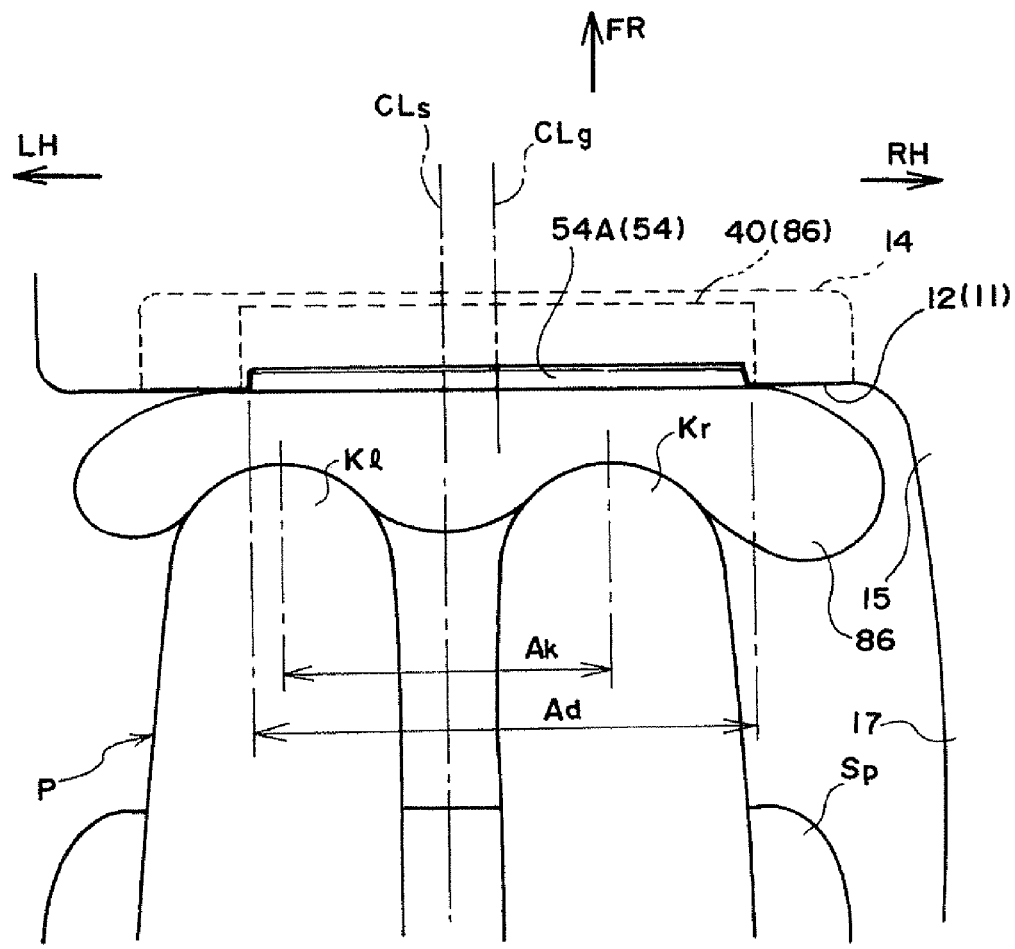
FIG. 3 is a plan view illustrating an operational state of the passenger seat knee airbag device relating to the first exemplary embodiment of the present invention.

As illustrated in FIG. 3, the passenger seat knee airbag device 10 described above is disposed to be offset in the vehicle lateral (left-right) direction from a center line CLs representing a vehicle lateral direction center of the passenger seat Sp, which serves as a seat (hereinafter referred to simply as the center line CLs). In the present exemplary embodiment, in which the passenger seat Sp is disposed at the left side, the passenger seat knee airbag device 10 is disposed with a vehicle lateral direction center line CLg of the glove box 14 (hereinafter referred to simply as the center line CLg) offset to the right side (the vehicle lateral direction inner side) relative to the center line CLs of the passenger seat Sp.

Although not illustrated, the center line CLg of the glove box 14 substantially coincides with vehicle lateral direction center lines of the airbag module 40 and the airbag doors 54. Furthermore, in this exemplary embodiment, the knee airbag 86 is structured with the deployed shape thereof being substantially symmetrical with respect to the center line CLg, and the folded shape is made substantially symmetrical with respect to the center line CLg.

The passenger seat knee airbag device 10 that is offset relative to the center line CLs of the passenger seat Sp as mentioned above is structured with a portion of the airbag doors 54 that is disposed at the left side of the center line CLs having a shorter vehicle lateral direction length than a portion thereof that is disposed at the right side of the center line CLs. The passenger seat knee airbag device 10 is structured with a region Ak of the airbag doors 54 between cap portions of the left and right knees Kl and Kr of the occupant P of the passenger seat Sp overlapping, across the whole vehicle lateral direction length thereof, with a formation zone Ad of the airbag doors 54.

In the passenger seat knee airbag device 10, as illustrated in FIG. 1, the tear line 102 of the retaining sheet 100 is formed non-symmetrically between left and right. Specifically, a portion of the tear line 102 of the retaining sheet 100 that is disposed at the left side relative to the center line CLg of the glove box 14 serves as a left side tear line 102L which is provided along a vehicle lateral direction (horizontal direction) at the vertical direction center of the retaining sheet 100 (the airbag module 40). Meanwhile, a portion of the tear line 102 that is disposed at the right side relative to the center line CLg serves as a right side tear line 102R which is provided along the vehicle lateral direction at the vehicle vertical direction lower side relative to the left side tear line 102L. In this exemplary embodiment, the left side tear line 102L and the right side tear line 102R are linked by a center tear line 102C, which is inclined with respect to the vehicle lateral direction.

A position in the vehicle vertical direction of the left side tear line 102L mentioned above substantially coincides with a position in the vehicle vertical direction of the division line 54A of the airbag doors 54. That is, the left side tear line 102L overlaps in rear view with a left side portion of the division line 54A of the airbag doors 54. On the other hand, the right side tear line 102R is disposed to be offset to the lower side in the vehicle vertical direction relative to the division line 54A of the airbag doors 54.

According to the above, the passenger seat knee airbag device 10 has a structure in which the tear line 102 of the retaining sheet 100 is more easily broken (is broken in a shorter duration) by a deployment pressure associated with deployment of the knee airbag 86 at the left side relative to the center line CLg than at the right side. Therefore, the passenger seat knee airbag device 10 has a structure in which the deployment pressure associated with deployment of the knee airbag 86 acts more quickly at the left side of the airbag doors 54 relative to the center line CLg than at the right side. Thus, in this exemplary embodiment, the left-right non-symmetricality based on the difference between relative positions in the vehicle vertical direction of the left side tear line 102L and right side tear line 102R structuring the tear line 102 with respect to the division line 54A (separation amounts) corresponds to a deployment timing adjustment structure of the present invention.

Next, operation of the present exemplary embodiment is described.

When a vehicle in which the passenger seat knee airbag device 10 of the structure described above is employed has a frontal collision, this state is detected by an unillustrated collision detector, and a detection signal is outputted to an airbag electronic control unit. When bag operation is decided on by the airbag ECU, various airbag devices operate at the driver side. In addition, in a condition in which an occupant P is sitting on the passenger seat Sp (for example, when a seat sensor or a buckle sensor is "on"), the passenger seat knee airbag device 10 also operates. That is, a predetermined current is passed through a squib in the inflator 70 of the airbag module 40 incorporated at the glove door 20, and the inflator 70 is operated. Hence, gas is generated from the inflator 70, and this gas is supplied into the knee airbag 86 accommodated in the glove door 20 in the folded state and causes the same to inflate.

When the knee airbag 86 in the folded state inflates and a bag inflation pressure (deployment pressure) acting on the tear lines 36 via the airbag door retainer 42 reaches a predetermined value, the tear line 102 of the retaining sheet 100 and the tear lines 36 of the glove door outer 24 break (cleave), and the airbag doors 54 are deployed upward and downward. Through the aperture portion 55 that is formed thus, the knee airbag 86 inflates and deploys in a space between the two knees Kl and Kr of the occupant and the glove door 20 (the instrument panel 11). As a result, the knees of the occupant are restrained by the knee airbag 86 and protected.

Now, in the passenger seat knee airbag device 10, the vertical position of the left side tear line 102L of the tear line 102 of the retaining sheet 100 coincides with the vertical position of the division line 54A of the airbag doors 54, whereas the vertical position of the right side tear line 102R is offset downward relative to the division line 54A. Therefore, with the passenger seat knee airbag device 10 that is disposed to be offset to rightward relative to the center line CLs of the passenger seat Sp, the right knee Kr and left knee Kl of the occupant P of the passenger seat Sp may be equally protected.

In, for example, a passenger seat knee airbag device 500 relating to a comparative example that is illustrated in FIG. 18, a linear tear line 502 in the retaining sheet 100 along the vehicle lateral direction is formed so as to substantially coincide with the division line 54A of the airbag doors 54. If this passenger seat knee airbag device 500 is disposed to be offset to rightward relative to the center line CLs, a right side portion of the knee airbag 86 restrains the right knee Kr preceding a left side portion restraining the left knee Kl. In this case, the right knee Kr of the occupant P of the passenger seat Sp is more strongly pressed than the left knee Kl (with an imbalance between left and right).

In contrast, in the passenger seat knee airbag device 10, the tear line 102 of the retaining sheet 100 is broken by the deployment pressure of the knee airbag 86 with the left side tear line 102L preceding relative to the right side tear line 102R. Therefore, the airbag doors 54 receive the deployment pressure of the knee airbag 86 with the left side portion preceding the right side portion. Thus, the division line 54A of the airbag doors 54 is broken (cleaved) with a left side portion preceding relative to a right side portion, and the airbag doors 54 are deployed upward and downward with a left side portion thereof preceding a right side portion (a left side portion of the aperture portion 55 precedes a right side portion thereof in being formed).

According to the above, in the passenger seat knee airbag device 10, the knee airbag 86 is deployed to the vehicle cabin side with the left side portion thereof preceding relative to the right side. Therefore, the left knee Kl that is disposed relatively further from the center line CLg of the glove box 14 may be protected equally with the right knee Kr that is disposed closer to the center line CLg. That is, with the passenger seat knee airbag device 10, the left knee Kl and right knee Kr of the occupant P may be equally restrained and protected with good balance, without reliance on tuning of the knee airbag (non-symmetricality of a deployed shape, a folded shape, specifications of tethers or the like).

Thus, with the passenger seat knee airbag device 10 relating to the first exemplary embodiment, deployment characteristics of the airbag doors 54 (the knee airbag 86) may be controlled by left-right non-symmetricality of the tear line 102 of the retaining sheet 100. Thus, with a structure in which the glove box 14 (the airbag doors 54) is offset in the vehicle lateral direction relative to the passenger seat Sp, both knees Kr and Kl of the seat occupant P may be effectively protected.

Furthermore, in the passenger seat knee airbag device 10, this is a structure that controls deployment characteristics of the airbag doors 54 (the knee airbag 86) by partially vertically offsetting the vertical position of the tear line 102 of the retaining sheet 100 covering the knee airbag 86 relative to the division line 54A of the airbag doors 54. That is, the passenger seat knee airbag device 10 is structured with a structure that, utilizing the fact that the closer in the vehicle vertical direction the tear line 102 of the retaining sheet 100 is disposed to the division line 54A of the airbag doors 54 (the vehicle vertical direction center of the airbag doors 54), the easier the airbag doors 54 are deployed, controls deployment characteristics of the airbag doors 54 with a simple structure.

In particular, because a vertical position of the left side tear line 102L substantially coincides with a vertical position of the division line 54A of the airbag doors 54 and a vertical position of the right side tear line 102R is offset relative to a vertical position of the division line 54A, the airbag doors 54 may be deployed in a short duration at the left side portion thereof. Therefore, an inflation deployment duration of the knee airbag 86 as a whole (a duration required for restraint of both knees Kr and Kl) may be shortened. Moreover, a range of specification of a deployment duration difference between the left side and the right side of the knee airbag 86 may be broadened.

Next, other exemplary embodiments of the present invention are described. Herein, components and portions that are the basically the same as in the above-described first exemplary embodiment or a previously mentioned structure are assigned the same reference numerals as in the above-described first exemplary embodiment or previously mentioned structure, and descriptions thereof are not given.

Second Exemplary Embodiment

Figure 9:
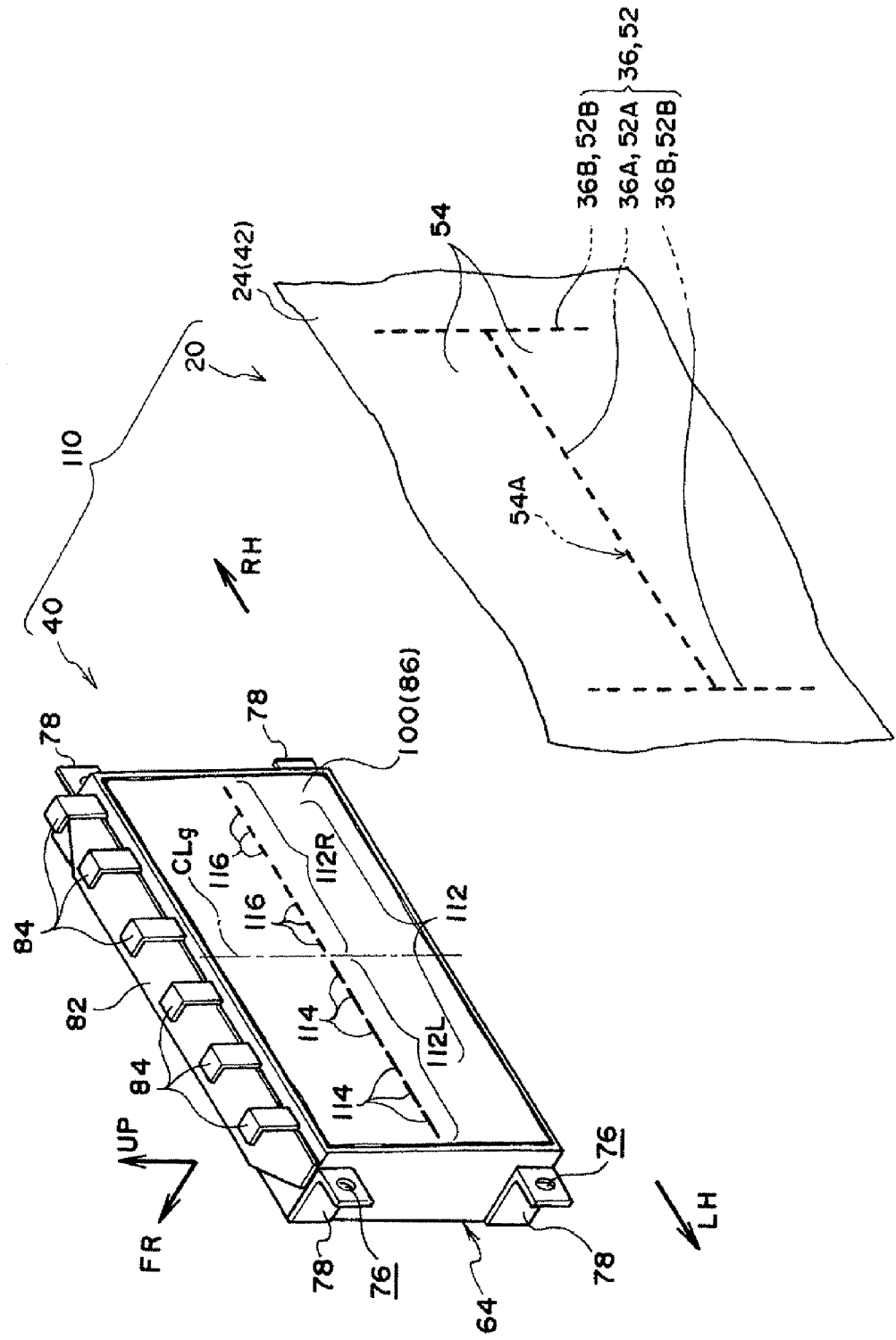
FIG. 9 is an exploded perspective view illustrating an airbag module and an airbag door retainer structuring a passenger seat knee airbag device relating to a second exemplary embodiment of the present invention.

In FIG. 9, principal elements of a passenger seat knee airbag device 110 relating to a second exemplary embodiment of the present invention are illustrated in an exploded perspective view corresponding with FIG. 1. As illustrated in this drawing, the passenger seat knee airbag device 110 differs from the passenger seat knee airbag device 10 in that a linear tear line 112 is formed in the retaining sheet 100 along the vehicle lateral direction in place of the tear line 102 whose vertical direction positions are made non-symmetrical between left and right.

Specifically, the tear line 112 has a left side tear line 112L, which is a left side portion thereof, and a right side tear line 112R, which is a right side portion thereof. The left side tear line 112L is structured and formed by plural cut portions (slits) 114 being linearly provided in the retaining sheet 100, and the right side tear line 112R is structured and formed by plural cut portions 116 being linearly provided in the retaining sheet 100.

In this exemplary embodiment, the cut portions 114 are formed with lengths thereof along the vehicle lateral direction being longer than the cut portions 116. That is, the left side tear line 112L is structured with a number of uncut portions between the cut portions 114 being fewer than a number of uncut portions between the plural cut portions 116 of the tear line 112. Therefore, the left side tear line 112L is made weaker with respect to deployment pressure of the knee airbag 86 than the right side tear line 112R.

According to the above, the passenger seat knee airbag device 110 has a structure in which the tear line 102 of the retaining sheet 100 is more easily broken (is broken in a shorter duration) by the deployment pressure associated with deployment of the knee airbag 86 at the left side relative to the center line CLg than at the right side. Therefore, the passenger seat knee airbag device 110 has a structure in which the deployment pressure associated with deployment of the knee airbag 86 acts more quickly at the left side of the airbag doors 54 relative to the center line CLg than at the right side. Thus, in this exemplary embodiment, the left-right non-symmetricality based on the difference in strength between the left side tear line 112L and right side tear line 112R structuring the tear line 112 corresponds to the deployment timing adjustment structure of the present invention. Other structures of the passenger seat knee airbag device 110 are the same as the corresponding structures of the passenger seat knee airbag device 10, including unillustrated portions.

Thus, with the passenger seat knee airbag device 110 relating to the second exemplary embodiment too, basically the same effect may be obtained by the same operation as with the passenger seat knee airbag device 10 relating to the first exemplary embodiment. Further, in the passenger seat knee airbag device 110, deployment characteristics of the airbag doors 54 (the knee airbag 86) may be controlled by the strength difference between left and right of the tear line 112 itself, regardless of a positional relationship between the division line 54A of the airbag doors 54 and the tear line 112.

Figure 10:
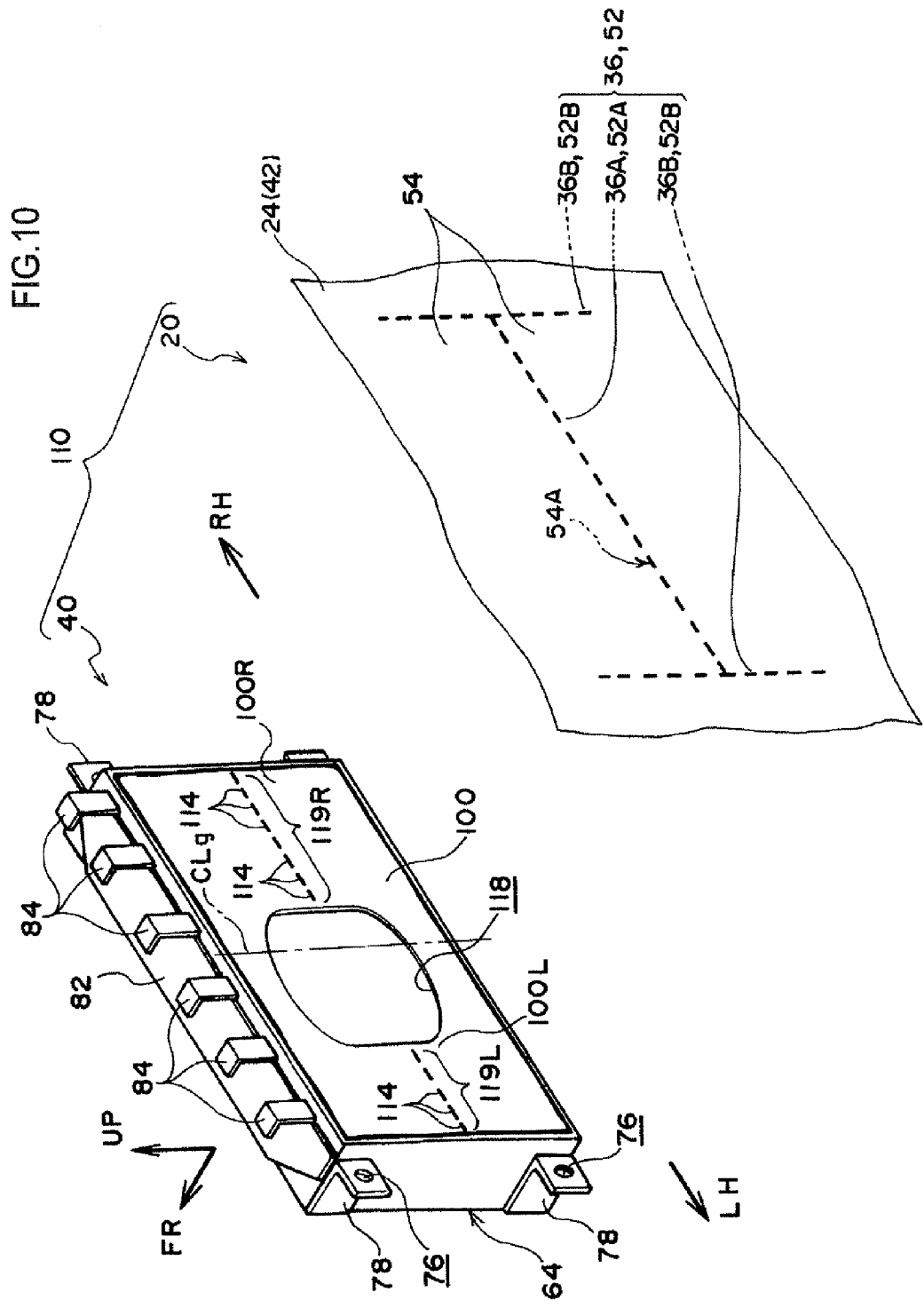
FIG. 10 is an exploded perspective view illustrating an airbag module and an airbag door retainer structuring a passenger seat knee airbag device relating to a variant example of the second exemplary embodiment of the present invention.

Herein, as illustrated in FIG. 10, the retaining sheet 100 may be structured with a window portion 118 being formed in a region of the retaining sheet 100 that covers the knee airbag 86 at the aperture side of the module case 64. The window portion 118 separates a right side portion 100R from a left side portion 100L, which has a smaller width than the right side portion 100R. In this variant example, tear lines 119R and 119L are formed, at which the plural cut portions 114 are provided along the vehicle lateral direction at the right side portion 100R and the left side portion 100L. Thus, in the present variant example, deployment characteristics of the airbag doors 54 (the knee airbag 86) may be controlled by left-right non-symmetricality based on a difference in width (strength) between the right side portion 100R and the left side portion 100L.

Third Exemplary Embodiment

Figure 11:
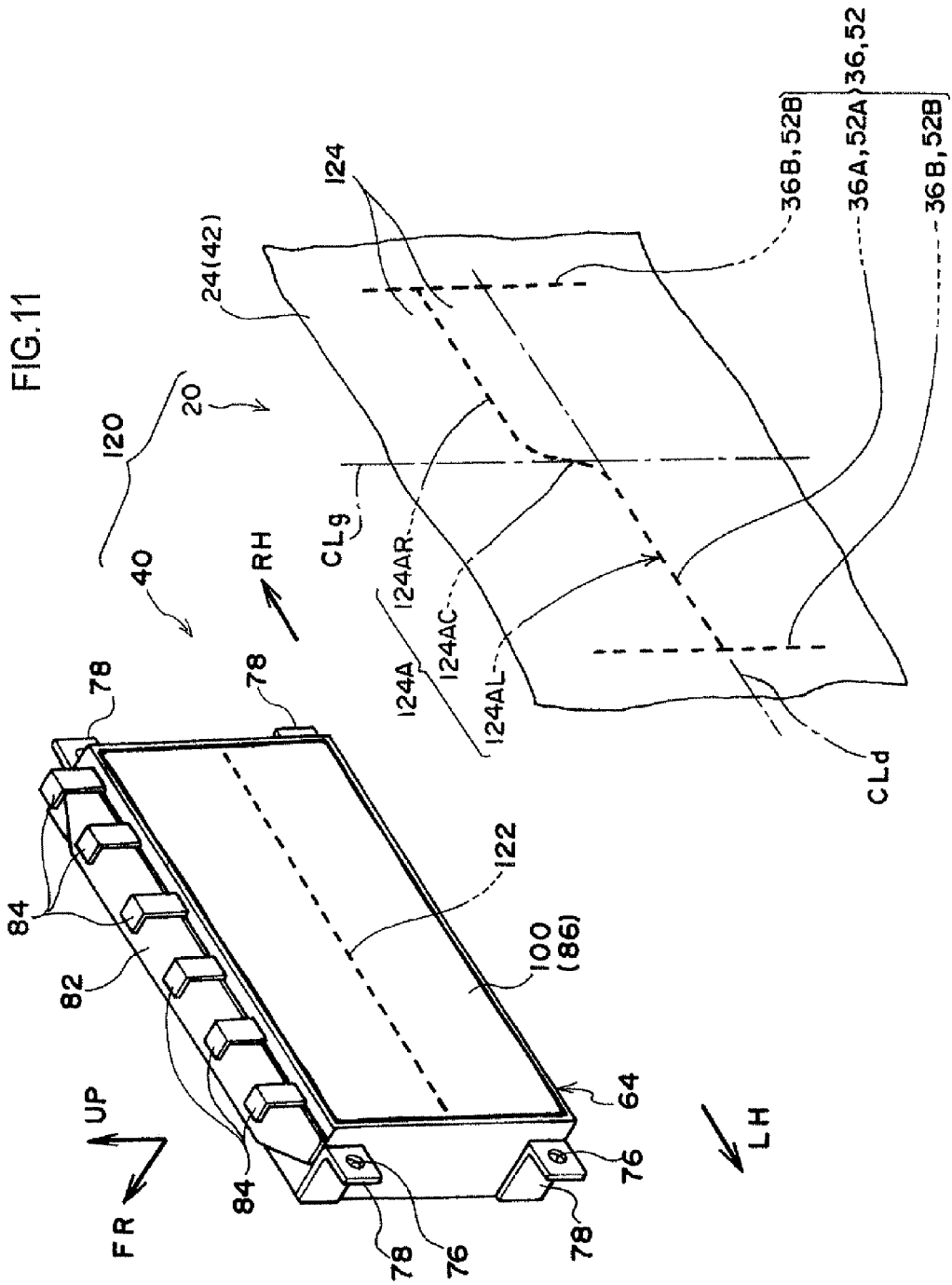
FIG. 11 is an exploded perspective view illustrating an airbag module and an airbag door retainer structuring a passenger seat knee airbag device relating to a third exemplary embodiment of the present invention.

In FIG. 11, principal elements of a passenger seat knee airbag device 120 relating to a third exemplary embodiment of the present invention are illustrated in an exploded perspective view corresponding with FIG. 1. As illustrated in this drawing, the passenger seat knee airbag device 120 differs from the passenger seat knee airbag device 10 in that a linear tear line 122 similar to the tear line 502 relating to the above-described comparative example is formed in the retaining sheet 100 and in that the glove door 20 is provided with airbag doors 124 in place of the airbag doors 54.

The airbag doors 124 differ from the division line 54A of the airbag doors 54 in that a division line 124A between above and below, which serves as the lateral direction tear line, is made non-symmetrical between left and right. Herein, the division line 124A is similar to the division line 54A of the airbag doors 54 in being structured by the lateral direction central tear line 36A formed at the glove door outer 24 and the lateral direction slit 52A formed at the airbag door retainer 42. In other words, it may be understood as the lateral direction central tear line 36A and lateral direction slit 52A of the passenger seat knee airbag device 120 having forms that differ from the lateral direction central tear line 36A and lateral direction slit 52A of the passenger seat knee airbag device 10 as follows.

Specifically, a left side portion of the division line 124A of the airbag doors 124 serves as a left side division line 124AL, a position of which in the vehicle vertical direction substantially coincides with a position in the vehicle vertical direction of a vehicle vertical direction center line CLd (hereinafter referred to simply as the center line CLd) of the airbag doors 124. Meanwhile, a right side portion of the division line 124A serves as a right side division line 124AR, a position of which in the vehicle vertical direction is offset upward in the vehicle vertical direction relative to the center line CLd. In this exemplary embodiment, the left side division line 124AL and the right side division line 124AR are linked by a center division line 124AC that is inclined with respect to the vehicle lateral direction.

According to the above, the passenger seat knee airbag device 120 has a structure in which the division line 124A of the airbag doors 124 is more easily broken (is broken in a shorter duration) by the deployment pressure associated with deployment of the knee airbag 86 at the left side relative to the center line CLg than at the right side. That is, the passenger seat knee airbag device 120 has a structure in which the airbag doors 124 are more easily deployed (are deployed in a shorter duration) at the left side than at the right side. Thus, in this exemplary embodiment, the left-right non-symmetricality of the form of the division line 124A of the airbag doors 124 corresponds to the deployment timing adjustment structure of the present invention. Other structures of the passenger seat knee airbag device 120 are the same as the corresponding structures of the passenger seat knee airbag device 10, including unillustrated portions.

Thus, with the passenger seat knee airbag device 120 relating to the third exemplary embodiment too, basically the same effect may be obtained by the same operation as with the passenger seat knee airbag device 10 relating to the first exemplary embodiment. That is, in the passenger seat knee airbag device 120, although the tear line 122 of the retaining sheet 100 is broken substantially simultaneously at right and left and the deployment pressure of the knee airbag 86 acts substantially uniformly on the respective portions of the airbag doors 124, the division line 124A is broken with the left side division line 124AL that is closer to the center line CLd preceding relative to the right side division line 124AR. Therefore, in the passenger seat knee airbag device 120, deployment characteristics of the airbag doors 124 (the knee airbag 86) may be controlled, similarly to the passenger seat knee airbag device 10, by non-symmetricality of the division line 124A of the airbag doors 124. Thus, with a structure in which the glove box 14 is offset in the vehicle lateral direction relative to the passenger seat Sp, both knees Kr and Kl of the seat occupant P may be effectively protected.

Furthermore, in the passenger seat knee airbag device 120, this is a structure that controls deployment characteristics of the airbag doors 124 (the knee airbag 86) by making vertical positions of the division line 124A of the airbag doors 124 non-symmetrical between left and right. That is, the passenger seat knee airbag device 120 is structured with a structure that, utilizing the fact that the closer in the vehicle vertical direction the division line 124A is disposed to the center line CLd, the easier the airbag doors 124 are deployed, controls deployment characteristics of the airbag doors 124 with a simple structure.

In particular, in the passenger seat knee airbag device 120, a vertical position of the left side division line 124AL substantially coincides with a vertical position of the center line CLd of the airbag doors 124 and a vertical position of the right side division line 124AR is offset relative to a vertical position of the center line CLd of the airbag doors 124. Therefore, in the passenger seat knee airbag device 120, the airbag doors 124 may be deployed in a short duration at the left side portion thereof. Thus, an inflation deployment duration of the knee airbag 86 as a whole (a duration required for restraint of both knees Kr and Kl) may be shortened. Moreover, a range of specification of a deployment duration difference between the left side and the right side of the knee airbag 86 may be broadened.

Furthermore, in the passenger seat knee airbag device 120, because the right side division line 124AR is positioned at the upper side relative to the center line CLd of the airbag doors 124, the knee airbag 86 is deployed with the right side portion at the vehicle vertical direction upper side relative to the left side portion. Therefore, the right side portion makes contact with an upper portion of the right leg of the seat occupant P (a portion closer to the right knee Kr). Accordingly, although a large pressure force is likely to act from the knee airbag 86 on the shin portion below the right knee Kr because it is disposed closer to the knee airbag 86 than the left knee Kl, a case of the shin portion below the right knee Kr being pressed by a strong force by the inflation and deployment of the knee airbag 86 is suppressed. That is, in a structure in which the passenger seat knee airbag device 500 illustrated in FIG. 18 is offset to rightward relative to the passenger seat Sp, the right leg that is relatively closer to the knee airbag 86 in the folded state is likely to be strongly pressed by the knee airbag 86. In contrast, with the passenger seat knee airbag device 120, because the airbag doors 124 are precedentially deployed preceding with the left side as described above, an imbalance of states of restraint on the left and right legs is moderated, and because the pressured position of the right leg portion of the right leg is set to the upper side that is close to the right knee Kr, the shin portion below the right knee Kr being pressed by a strong force may be suppressed as described above.

Fourth Exemplary Embodiment

Figure 12:
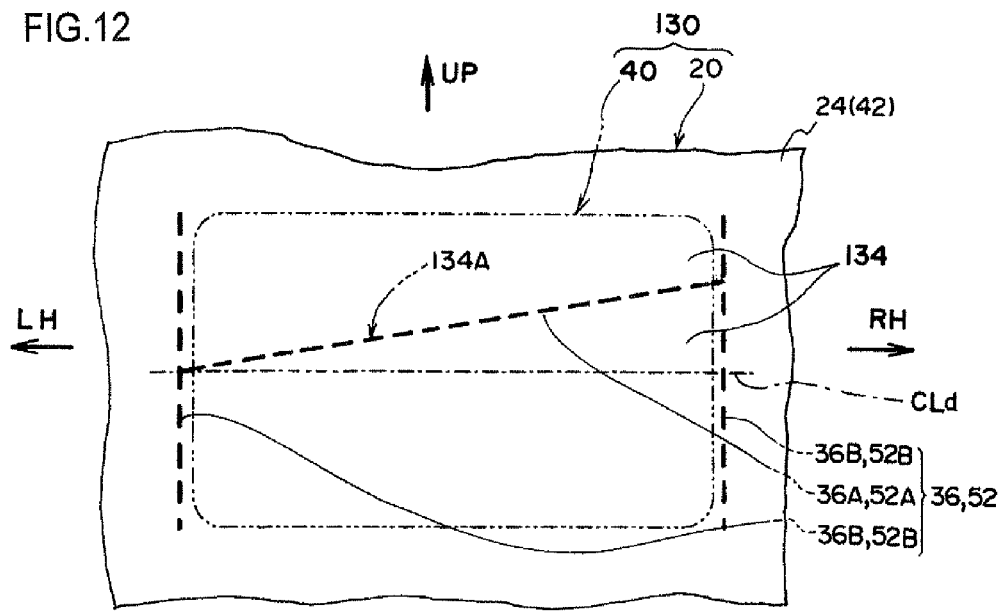
FIG. 12 is a front view illustrating an airbag door retainer structuring a passenger seat knee airbag device relating to a fourth exemplary embodiment of the present invention.

In FIG. 12, the airbag door retainer 42 structuring a passenger seat knee airbag device 130 relating to a fourth exemplary embodiment of the present invention is illustrated in a front view (a rear view). As illustrated in this drawing, the passenger seat knee airbag device 130 differs from the passenger seat knee airbag device 120 in that the glove door 20 is provided with airbag doors 134 in place of the airbag doors 124.

The airbag doors 134 are similar to the airbag doors 124 in that a division line 134A between above and below that serves as the lateral direction tear line is made non-symmetrical between left and right. However, the form of (the lateral direction central tear line 36A and lateral direction slit 52A structuring) the division line 134A is different from the division line 124A.

Specifically, the division line 134A of the airbag doors 134 is formed as a single straight line that is inclined relative to the vehicle lateral direction. At the left end of the division line 134A, the vehicle vertical direction position thereof substantially coincides with the center line CLd of the airbag doors 134. At the right end of the division line 134A, the vehicle vertical direction position thereof is offset upward relative to the center line CLd of the airbag doors 134.

According to the above, the passenger seat knee airbag device 130 has a structure in which the division line 134A of the airbag doors 134 is more easily broken (is broken in a shorter duration) by the deployment pressure associated with deployment of the knee airbag 86 at the left side relative to the center line CLg than at the right side. That is, the passenger seat knee airbag device 130 has a structure in which the airbag doors 134 are more easily deployed (are deployed in a shorter duration) at the left side than at the right side. Thus, in this exemplary embodiment, the left-right non-symmetricality of the shape of the division line 134A of the airbag doors 134 corresponds to the deployment timing adjustment structure of the present invention. Other structures of the passenger seat knee airbag device 130 are the same as the corresponding structures of the passenger seat knee airbag device 120, including unillustrated portions.

Thus, with the passenger seat knee airbag device 130 relating to the fourth exemplary embodiment too, basically the same effects may be obtained by the same operation as with the passenger seat knee airbag device 120 relating to the third exemplary embodiment (the passenger seat knee airbag device 10).

Fifth Exemplary Embodiment

Figure 13:
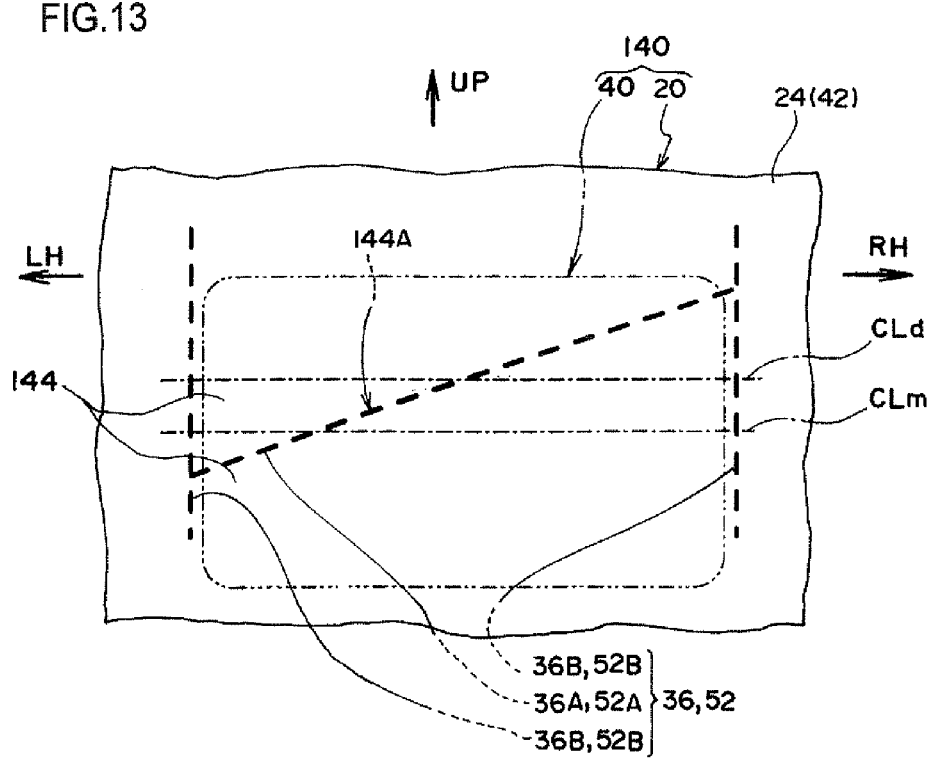
FIG. 13 is a front view illustrating an airbag door retainer structuring a passenger seat knee airbag device relating to a fifth exemplary embodiment of the present invention.

In FIG. 13, the airbag door retainer 42 structuring a passenger seat knee airbag device 140 relating to a fifth exemplary embodiment of the present invention is illustrated in a front view (a rear view). As illustrated in this drawing, the passenger seat knee airbag device 140 differs from the passenger seat knee airbag device 120 in that the glove door 20 is provided with airbag doors 144 in place of the airbag doors 124.

The airbag doors 144 are similar to the airbag doors 124 in that a division line 144A between above and below that serves as the lateral direction tear line is made non-symmetrical between left and right. However, the form of (the lateral direction central tear line 36A and the lateral direction slit 52A structuring) the division line 144A is different from the division line 124A. In this exemplary embodiment, the division line 144A is structured with vehicle vertical direction separation amounts of the division line 144A from the center line CLd being symmetrical between left and right. More specifically, the division line 144A is formed as a single straight line that is inclined relative to the vehicle lateral direction such that the right end is disposed to the upper side in the vehicle vertical direction relative to the left end, and the division line 144A crosses the center line CLd at a vehicle lateral direction central portion.

In the passenger seat knee airbag device 140, the airbag module 40 is disposed to be offset in the vehicle vertical direction relative to the airbag doors 144. In this exemplary embodiment, the airbag module 40 is offset to the lower side relative to the airbag doors 144 such that a vehicle vertical direction center line CLm of the airbag module 40 (hereinafter referred to simply as the center line CLm) is disposed to downward relative to the vertical center line CLd of the airbag doors 144. Therefore, in the passenger seat knee airbag device 140, the division line 144A crosses the center line CLm of the airbag module 40 (the tear line 122 of the retaining sheet 100) at a right side portion in rear view. Thus, in the passenger seat knee airbag device 140, the division line 144A is made non-symmetrical between left and right in terms of vehicle vertical direction separation amounts from the center line CLm of the airbag module 40.

According to the above, the passenger seat knee airbag device 140 has a structure in which the division line 144A of the airbag doors 144 is more easily broken (is broken in a shorter duration) by the deployment pressure associated with deployment of the knee airbag 86 at the left side relative to the center line CLg than at the right side. That is, the passenger seat knee airbag device 140 has a structure in which the airbag doors 144 are more easily deployed (are deployed in a shorter duration) at the left side than at the right side. Thus, in this exemplary embodiment, the left-right non-symmetricality of the division line 144A of the airbag doors 144 with respect to the center line CLm of the airbag module 40 corresponds to the deployment timing adjustment structure of the present invention. Other structures of the passenger seat knee airbag device 140 are the same as the corresponding structures of the passenger seat knee airbag device 120, including unillustrated portions.

Thus, with the passenger seat knee airbag device 140 relating to the fifth exemplary embodiment too, basically the same effects may be obtained by the same operation as with the passenger seat knee airbag device 120 relating to the third exemplary embodiment (the passenger seat knee airbag device 10).

Sixth Exemplary Embodiment

In FIG. 14, the airbag door retainer 42 structuring a passenger seat knee airbag device 150 relating to a sixth exemplary embodiment of the present invention is illustrated in a front view (a rear view). As illustrated in this drawing, the passenger seat knee airbag device 150 differs from the passenger seat knee airbag device 140 in that the airbag module 40 is disposed to be inclined relative to the glove door 20 (the glove box 14).

Specifically, the airbag module 40 is disposed to be inclined as a whole such that the right side portion is disposed at the vehicle vertical direction upper side relative to the left side portion. Therefore, the vehicle vertical direction center line CLm of the airbag module 40 (the tear line 122 of the retaining sheet 100) is inclined such that the right end is disposed at the upper side relative to the left end. Airbag doors 154 that are inclined relative to the glove door 20 are formed in accordance with this arrangement of the airbag module 40.

The left and right vertical tear lines 36B and vertical slits 52B, which constitute both left and right edge portions of the airbag doors 154, are inclined relative to the vehicle vertical direction such that respective upper ends thereof are disposed to the left side relative to the lower ends, and so as to be parallel with one another. The lateral direction central tear line 36A and lateral direction slit 52A, which constitute a division line 154A between above and below of the airbag doors 154, are formed as a single straight line that is inclined relative to the vehicle lateral direction such that the right end is disposed at the upper side in the vehicle vertical direction relative to the left end.

The division line 154A, which serves as the lateral direction tear line, is formed with an inclination angle thereof relative to the vehicle lateral direction being larger than an inclination angle of the airbag module 40 relative to the vehicle lateral direction. This division line 154A crosses the center line CLd of the airbag doors 154 at a vehicle lateral direction central portion. That is, the division line 154A is formed to be symmetrical between left and right in terms of separation amounts in the vehicle vertical direction from the center line CLd of the airbag doors 154.

In the passenger seat knee airbag device 150, the airbag module 40 is disposed to be offset in the vehicle vertical direction relative to the airbag doors 154. In this exemplary embodiment, the airbag module 40 is offset to the lower side relative to the airbag doors 154 such that the center line CLm thereof crosses the center line CLd of the airbag doors 154 at the right side relative to the vehicle lateral direction center thereof. Thus, in the passenger seat knee airbag device 150, the division line 154A is made non-symmetrical between left and right in terms of vehicle vertical direction separation amounts from the center line CLm of the airbag module 40.

According to the above, the passenger seat knee airbag device 150 has a structure in which the division line 154A of the airbag doors 154 is more easily broken (is broken in a shorter duration) by the deployment pressure associated with deployment of the knee airbag 86 at the left side relative to the center line CLg than at the right side. That is, the passenger seat knee airbag device 150 has a structure in which the airbag doors 154 are more easily deployed (are deployed in a shorter duration) at the left side than at the right side. Thus, in this exemplary embodiment, the left-right non-symmetricality of the division line 154A of the airbag doors 154 with respect to the center line CLm of the airbag module 40 corresponds to the deployment timing adjustment structure of the present invention. Other structures of the passenger seat knee airbag device 150 are the same as the corresponding structures of the passenger seat knee airbag device 140, including unillustrated portions.

Thus, with the passenger seat knee airbag device 150 relating to the sixth exemplary embodiment too, basically the same effects may be obtained by the same operation as with the passenger seat knee airbag device 140 relating to the fifth exemplary embodiment (the passenger seat knee airbag devices 10 and 120).

Now, the structure in which the airbag module 40 is inclinedly disposed with respect to the airbag door retainer 42 may be structured as in the reference example illustrated in FIG. 15. In a passenger seat knee airbag device 155 relating to this reference example, a division line 158A between above and below of an airbag door 158 extends along the center line CLm of the airbag module 40 (the tear line 122 of the retaining sheet 100). In this passenger seat knee airbag device 155, the knee airbag 86 has substantially simultaneous deployment timings at the left side and the right side, but the right side portion deploys at the vehicle vertical direction upper side relative to the left side portion. Therefore, with the passenger seat knee airbag device 155 too, similarly to the passenger seat knee airbag devices 120 and 150, a case of the shin portion below the right knee Kr being pressed by a strong force by the inflation and deployment of the knee airbag 86 is suppressed.

Seventh Exemplary Embodiment

Figure 17:
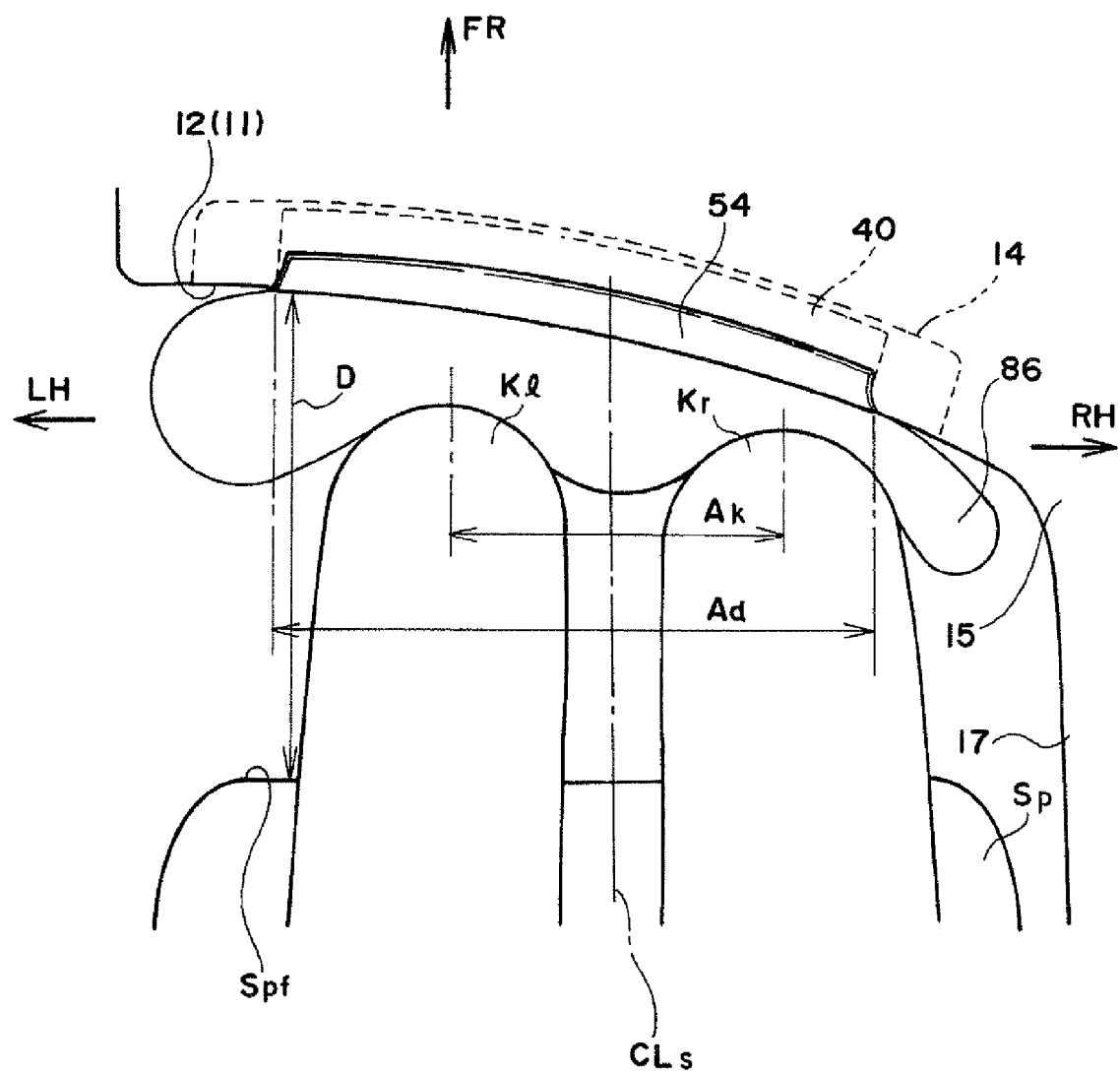
FIG. 17 is a plan view illustrating an operational state of the passenger seat knee airbag device relating to the seventh exemplary embodiment of the present invention.

In FIG. 16, principal elements of a passenger seat knee airbag device 160 relating to a seventh exemplary embodiment of the present invention are illustrated in an exploded perspective view corresponding with FIG. 1. In FIG. 17, the passenger seat knee airbag device 160 is illustrated in a plan view corresponding with FIG. 3. As illustrated in these drawings, the passenger seat knee airbag device 160 differs from the passenger seat knee airbag device 10 in being employed in an automobile that includes the instrument panel 11 with a rounded shape that is curved in plan view.

As illustrated in FIG. 17, the instrument panel 11 and the glove box 14 have rounded shapes such the rear faces thereof are disposed further to rearward in the vehicle longitudinal direction closer to the center cluster 15 (the vehicle lateral direction inner side). As illustrated in FIG. 16, the base portion 44 of the airbag door retainer 42 is curved in correspondence with the rounded shape of the glove box 14 (the glove door outer 24) so as to be disposed further rearward in the vehicle longitudinal direction closer to the vehicle lateral direction inner side.

Therefore, in this passenger seat knee airbag device 160, the airbag doors 54 are structured with a distance D along the vehicle longitudinal direction from a front edge Spf of the passenger seat Sp being smaller toward the right side. In other words, the passenger seat knee airbag device 160 is structured with the airbag doors 54 (the knee airbag 86) being disposed closer in the vehicle longitudinal direction to the right knee Kr than to the left knee Kl.

In the passenger seat knee airbag device 160, as illustrated in FIG. 16, a tear line 162 of the retaining sheet 100 is formed non-symmetrically between left and right. Specifically, a portion of the tear line 162 of the retaining sheet 100 that is disposed at the right side relative to the center line CLg of the glove box 14 serves as a right side tear line 162R which is provided along the vehicle lateral direction (the horizontal direction) at the vertical direction center of the retaining sheet 100. Meanwhile, a portion of the tear line 162 that is disposed at the left side relative to the center line CLg serves as a left side tear line 162L which is provided along the vehicle lateral direction at the vehicle vertical direction lower side relative to the right side tear line 162R. In this exemplary embodiment, the left side tear line 162L and the right side tear line 162R are linked by a center tear line 162C, which is inclined with respect to the vehicle lateral direction.

A position in the vehicle vertical direction of the right side tear line 162R mentioned above substantially coincides with a position in the vehicle vertical direction of the division line 54A of the airbag doors 54. That is, the right side tear line 162R overlaps with a left side portion of the division line 54A of the airbag doors 54 in rear view. On the other hand, the left side tear line 162L is disposed to be offset to the lower side in the vehicle vertical direction relative to the division line 54A of the airbag doors 54.

According to the above, the passenger seat knee airbag device 160 has a structure in which the tear line 162 of the retaining sheet 100 is more easily broken (is broken in a shorter duration) by the deployment pressure associated with deployment of the knee airbag 86 at the right side relative to the center line CLg than at the left side. Therefore, the passenger seat knee airbag device 160 has a structure in which the deployment pressure associated with deployment of the knee airbag 86 acts more quickly at the right side of the airbag doors 54 relative to the center line CLg than at the left side. Thus, in this exemplary embodiment, the difference between relative positions of the left side tear line 162L and right side tear line 162R structuring the tear line 162 with respect to the division line 54A (separation amounts in the vehicle vertical direction) corresponds to the deployment timing adjustment structure of the present invention.

Next, operation of the present exemplary embodiment is described.

When a vehicle in which the passenger seat knee airbag device 160 of the structure described above is employed has a frontal collision, this state is detected by the unillustrated collision detector, and a detection signal is outputted to the airbag ECU. When bag operation is decided on by the airbag ECU, various airbag devices operate at the driver side. In addition, in a condition in which an occupant P is setting on the passenger seat Sp (for example, when a seat sensor or a buckle sensor is "on"), the passenger seat knee airbag device 160 also operates. That is, a predetermined current is passed through the squib in the inflator 70 of the airbag module 40 incorporated at the glove door 20, and the inflator 70 is operated. Hence, gas is generated from the inflator 70, and this gas is supplied into the knee airbag 86 accommodated in the glove door 20 in the folded state and causes the same to inflate.

When the knee airbag 86 in the folded state inflates and the bag inflation pressure (deployment pressure) acting on the tear lines 36 via the airbag door retainer 42 reaches a predetermined value, the tear line 162 of the retaining sheet 100 and the tear lines 36 of the glove door outer 24 break (cleave), and the pair of airbag doors 54 are deployed upward and downward. Through the aperture portion 55 that is formed thus, the knee airbag 86 inflates and deploys in the space between the knees of the occupant and the glove door 20 (the instrument panel 11). As a result, the knees of the occupant are restrained by the knee airbag 86 and protected.

In the passenger seat knee airbag device 160, the vertical position of the right side tear line 162R of the tear line 162 of the retaining sheet 100 coincides with the vertical position of the division line 54A of the airbag doors 54, whereas the vertical position of the left side tear line 162L is offset downward relative to the division line 54A. Therefore, the knee airbag 86 may be inflated and deployed in a short time toward the right knee Kr, which is closer to the glove box 14 in the vehicle longitudinal direction, than to the left knee Kr. That is, in the passenger seat knee airbag device 160, by the right side portion of the knee airbag 86 being deployed more quickly than the left side portion, the right knee Kr that has a shorter free running distance during the frontal collision may be effectively restrained (protected).

Thus, in the passenger seat knee airbag device 160 relating to the seventh exemplary embodiment, deployment characteristics of the airbag doors 54 (the knee airbag 86) may be controlled by left-right non-symmetricality of the tear line 162 of the retaining sheet 100. Thus, with a structure in which the glove box 14 is offset in the vehicle lateral direction relative to the passenger seat Sp, both knees Kr and Kl of the seat occupant P may be effectively protected.

Furthermore, in the passenger seat knee airbag device 160, this is a structure that controls deployment characteristics of the airbag doors 54 (the knee airbag 86) by partially vertically offsetting the vertical position of the tear line 162 of the retaining sheet 100 covering the knee airbag 86 relative to the division line 54A of the airbag doors 54. That is, the passenger seat knee airbag device 160 is structured with a structure that, utilizing the fact that the closer in the vehicle vertical direction the tear line 162 of the retaining sheet 100 is disposed to the division line 54A of the airbag doors 54 (the vehicle vertical direction center of the airbag doors 54), the easier the airbag doors 54 are deployed, controls deployment characteristics of the airbag doors 54 with a simple structure.

In particular, because a vertical position of the right side tear line 162R substantially coincides with a vertical position of the division line 54A of the airbag doors 54 and a vertical position of the left side tear line 162L is offset relative to a vertical position of the division line 54A, the airbag doors 54 may be deployed in a short duration at the left side portion thereof. Therefore, an inflation deployment duration of the knee airbag 86 as a whole (a duration required for restraint of both knees Kr and Kl) may be shortened. Moreover, a range of specification of a deployment duration difference between the left side and the right side of the knee airbag 86 may be broadened.

Here, in the seventh exemplary embodiment, an example is illustrated in which the deployment characteristics of the knee airbag 86 are controlled by the non-symmetricality of the tear line 162 of the retaining sheet 100, but the present invention is not to be limited thus. For example, the passenger seat knee airbag device 160 may be structured employing a deployment timing adjustment structure of the second to sixth exemplary embodiments. When a deployment timing adjustment structure of the second to sixth exemplary embodiments is employed in the seventh exemplary embodiment, the deployment timing adjustment structure may be employed with the portions constituting the non-symmetricality being flipped between left and right relative to the second to sixth exemplary embodiments, as with the tear line 162 relative to the tear line 102.

In the respective exemplary embodiments described above, examples are illustrated that are provided with the airbag door retainer 42 serving as an interior panel, but the present invention is not to be limited thus. For example, structures are possible that are not provided with the airbag door retainer 42 (the glove door outer 24 is combined with the airbag door retainer 42).

Further, in the respective exemplary embodiments described above, examples are illustrated in which the passenger seat knee airbag device 150 is operated, but the present invention is not to be limited thus. For example, a structure is possible in which a collision predictor such as a pre-crash sensor or the like is installed in the vehicle, and the passenger seat knee airbag device 150 is operated when a collision is predicted by the collision predictor.

Further still, to understand the term "incorporated" when referring to the passenger seat knee airbag device 150 of the type that is incorporated in a glove door relating to the present exemplary embodiment, this is not limited to all the major structural elements of the knee airbag device being disposed at the inside of the glove door 20. Provided at least the knee airbag 86 is provided at the inside of the glove door 20, this is to be covered by the term "incorporated". Therefore, the inflator 70 and knee airbag 86 as described above may be put into fluid communication by a fluid communicator such as a hose or the alike, and the inflator 70 may be provided at the glove box main body 16, or provided at the instrument panel 11, or provided at a body such as an in-panel instrument or the like, or provided at installed equipment such as an air-conditioning unit or the like.

Further, in the exemplary embodiments described above, examples are illustrated in which the passenger seat Sp is disposed at the left side but the present invention is not to be limited thus. For example, structures are possible in which the passenger seat Sp is disposed at the right side.

Further, in the exemplary embodiments described above, examples have been illustrated in which the present invention is applied to the passenger seat knee airbag devices 10 to 160 that are mounted at the glove door in which the airbag module 40 is assembled to the glove box 14, but the present invention is not to be limited thus. For example, structures are possible in which the airbag module 40 is assembled to the instrument panel lower 12, which serves as the interior panel. This structure is also applicable to, for example, a knee airbag device for a driver seat.

The invention claimed is:

1. A knee airbag device for a vehicle, comprising:
    airbag doors that are provided by forming a tear line at an interior panel of the vehicle, the tear line being broken and the airbag doors producing an aperture portion in the interior panel by being deployed upward and downward;
    a knee airbag that is accommodated in a folded state at an opposite side of the interior panel from a vehicle cabin side thereof, the knee airbag, by receiving a gas supply from a gas generating device, breaking the tear line of the interior panel and causing the airbag doors to deploy upward and downward with deployment pressure, and being inflated and deployed through the aperture portion toward knees of an occupant; and
    a deployment timing adjustment structure that causes timings at which the airbag doors are deployed by inflation pressure of the knee airbag to differ between a portion of the airbag doors that is disposed at one side relative to a vehicle lateral direction center of a seat and a portion that is disposed at the other side,
    wherein the airbag doors are provided with a position at a vehicle lateral direction center of the airbag doors being offset in the vehicle lateral direction relative to a position of the vehicle lateral direction center of the seat, and
    the deployment timing adjustment structure is structured such that a side of the airbag doors that is opposite from the side that is offset relative to the vehicle lateral direction center of the seat is deployed earlier than the offset side.

2. The knee airbag device for a vehicle according to claim 1, further comprising a retaining sheet that covers the folded knee airbag and in which a tear line that is broken in association with inflation of the knee airbag is formed along the vehicle lateral direction,
    wherein the deployment timing adjustment structure is structured by setting separation amounts in a vehicle vertical direction between the tear line of the retaining sheet and a lateral direction tear line along the vehicle lateral direction of the interior panel to be smaller at the side that is deployed earlier than the side that is deployed later.

3. The knee airbag device for a vehicle according to claim 2, wherein the deployment timing adjustment structure is structured with positions in the vehicle vertical direction of the tear line of the retaining sheet and the lateral direction tear line of the interior panel being caused to coincide at the side that is deployed earlier, and the tear line of the retaining sheet and the lateral direction tear line of the interior panel being offset in the vehicle vertical direction at the side that is deployed later.

4. The knee airbag device for a vehicle according to claim 1, further comprising a retaining sheet that covers the folded knee airbag and in which a tear line that is broken in association with inflation of the knee airbag is formed along the vehicle lateral direction,
    wherein the deployment timing adjustment structure is structured with, of the tear line of the retaining sheet, the tear line at the side that is deployed earlier being weakened, with respect to the deployment pressure of the knee airbag, relative to the tear line at the side that is deployed later.

5. The knee airbag device for a vehicle according to claim 1, wherein the tear line of the interior panel includes a lateral direction tear line along the vehicle lateral direction and a pair of left and right vertical tear lines extending in a vehicle vertical direction from two ends of the lateral direction tear line,
    and the deployment timing adjustment structure is structured by setting separation amounts in the vehicle vertical direction of the lateral direction tear line from a vehicle vertical direction center of the airbag doors to be smaller at the side that is deployed earlier than the side that is deployed later.

6. The knee airbag device for a vehicle according to claim 5, wherein the deployment timing adjustment structure is structured with the lateral direction tear line being caused to coincide with a position of the vehicle vertical direction center of the airbag doors at the side that is deployed earlier, and the lateral direction tear line being offset to an upper side in the vehicle vertical direction from a position of the vehicle vertical direction center of the airbag doors at the side that is deployed later.

7. The knee airbag device for a vehicle according to claim 1, wherein the tear line of the interior panel includes a lateral direction tear line along the vehicle lateral direction and a pair of left and right vertical tear lines extending in a vehicle vertical direction from two ends of the lateral direction tear line along the vehicle lateral direction, and the deployment timing adjustment structure is structured by inclining the lateral direction tear line such that the lateral direction tear line is disposed closer to a vehicle vertical direction center of the airbag doors at the side that is deployed earlier than the side that is deployed later.

8. The knee airbag device for a vehicle according to claim 1, wherein the tear line of the interior panel includes a lateral direction tear line along the vehicle lateral direction and a pair of left and right vertical tear lines extending in a vehicle vertical direction from two ends of the lateral direction tear line along the vehicle lateral direction, and the deployment timing adjustment structure is structured by disposing the knee airbag to be offset in the vehicle vertical direction relative to the airbag doors such that separation amounts of the lateral direction tear line from a vehicle vertical direction center of the knee airbag are smaller at the side that is deployed earlier than the side that is deployed later.

9. The knee airbag device for a vehicle according to claim 1, wherein the interior panel structures a glove door provided at an instrument panel, and the knee airbag is incorporated at the glove door.

10. A knee airbag device for a vehicle, comprising:

airbag doors that are provided by forming a tear line at an interior panel of the vehicle, the tear line being broken and the airbag doors producing an aperture portion in the interior panel by being deployed upward and downward;

a knee airbag that is accommodated in a folded state at an opposite side of the interior panel from a vehicle cabin side thereof, the knee airbag, by receiving a gas supply from a gas generating device, breaking the tear line of the interior panel and causing the airbag doors to deploy upward and downward with deployment pressure, and being inflated and deployed through the aperture portion toward knees of an occupant; and a deployment timing adjustment structure that causes timings at which the airbag doors are deployed by inflation pressure of the knee airbag to differ between a portion of the airbag doors that is disposed at one side relative to a vehicle lateral direction center of a seat and a portion that is disposed at the other side, wherein the airbag doors are inclined or curved in plan view such that distances in a vehicle longitudinal direction from a front edge of the seat are different between one vehicle lateral direction side and the other side, and the deployment timing adjustment structure is structured such that the side of the airbag doors that is closer to the front edge of the seat is deployed earlier than the side that is further.

* * * * *